(12) United States Patent
Lee et al.

(10) Patent No.: US 12,113,828 B2
(45) Date of Patent: Oct. 8, 2024

(54) SYSTEM AND METHOD FOR DETECTING PHISHING-DOMAINS IN A SET OF DOMAIN NAME SYSTEM (DNS) RECORDS

(71) Applicant: ENSIGN INFOSECURITY PTE. LTD., Singapore (SG)

(72) Inventors: Joon Sern Lee, Singapore (SG); Gui Peng David Yam, Singapore (SG); Yongcheng Huang, Singapore (SG); Jin Hao Chan, Singapore (SG); Xingru Chen, Singapore (SG)

(73) Assignee: ENSIGN INFOSECURITY PTE. LTD., Singapore (SG)

( * ) Notice: Subject to any disclaimer, the term of this patent is extended or adjusted under 35 U.S.C. 154(b) by 214 days.

(21) Appl. No.: 17/662,583

(22) Filed: May 9, 2022

(65) Prior Publication Data

US 2022/0377107 A1    Nov. 24, 2022

(30) Foreign Application Priority Data

May 7, 2021  (SG) ............................. 10202104779P
Jun. 23, 2021 (SG) ............................. 10202106833S

(51) Int. Cl.
*H04L 9/40*    (2022.01)
*G06F 18/22*    (2023.01)
*G06F 18/231*    (2023.01)

(52) U.S. Cl.
CPC .......... *H04L 63/1483* (2013.01); *G06F 18/22* (2023.01); *G06F 18/231* (2023.01)

(58) Field of Classification Search
CPC ..................... H04L 63/1483; H04L 63/1441
See application file for complete search history.

(56) References Cited

U.S. PATENT DOCUMENTS 11,057,414 B1 *  7/2021  Giorgio ............... H04L 63/1416
11,436,330 B1 *  9/2022  Jennings ............... G06F 21/563
11,843,622 B1 * 12/2023  Tellez ................. H04L 63/1425
(Continued)

OTHER PUBLICATIONS

B. Liu et al., "A Reexamination of Internationalized Domain Names: The Good, the Bad and the Ugly," 2018 48th Annual IEEE/IFIP International Conference on Dependable Systems and Networks (DSN), Luxembourg, Luxembourg, 2018, pp. 654-665. (Year: 2018).*

(Continued)

*Primary Examiner* — Kari L Schmidt
(74) *Attorney, Agent, or Firm* — Sterne, Kessler, Goldstein, and Fox, P.L.L.C.

(57) ABSTRACT

This document describes a system and method for detecting phishing-domains, which are used by cyber-attackers to carry out phishing attacks, in a set of Domain Name System (DNS) records, the system comprising a homoglyph phishing domain detection module, a typo-squatting phishing domain detection module, a general phishing domain detection module and an alert module. These modules are configured to collaboratively detect and identify phishing-domains from the set of DNS records using a combination of homoglyph, typo-squatting and general phishing domain techniques. Subsequently, an alert module may be used to correlate the alerts from the various phishing detection modules to discover phishing campaigns occurring in DNS network data.

20 Claims, 12 Drawing Sheets

(56) References Cited

U.S. PATENT DOCUMENTS

| | | | | |
|---|---|---|---|---|
| 2014/0237091 | A1* | 8/2014 | Sabin | H04L 63/1433 726/22 |
| 2014/0298460 | A1* | 10/2014 | Xue | H04L 63/1425 726/23 |
| 2016/0352772 | A1* | 12/2016 | O'Connor | H04L 63/1483 |
| 2021/0051176 | A1* | 2/2021 | Stolfo | H04L 63/1491 |
| 2021/0097168 | A1* | 4/2021 | Patel | G06F 21/554 |
| 2021/0320946 | A1* | 10/2021 | Boshmaf | H04L 63/0823 |
| 2022/0182410 | A1* | 6/2022 | Tupsamudre | H04L 63/1483 |
| 2023/0065676 | A1* | 3/2023 | Obstfeld | H04L 67/12 |

OTHER PUBLICATIONS

Ke Tian, Steve T. K. Jan, Hang Hu, Danfeng Yao, and Gang Wang. 2018. Needle in a Haystack: Tracking Down Elite Phishing Domains in the Wild. In Proceedings of the Internet Measurement Conference 2018 (IMC '18). Association for Computing Machinery, New York, NY, USA, 429-442. (Year: 2018).*

L. Joon Sern and Y. Gui Peng David, "TypoSwype: An Imaging Approach to Detect Typo-Squatting," 2021 11th IFIP International Conference on New Technologies, Mobility and Security (NTMS), Paris, France, 2021, pp. 1-5. (Year: 2021).*

R. Vinayakumar, M. Alazab, S. Srinivasan, Q.-V. Pham, S. K. Padannayil and K. Simran, "A Visualized Botnet Detection System Based Deep Learning for the Internet of Things Networks of Smart Cities," in IEEE Transactions on Industry Applications, vol. 56, No. 4, pp. 4436-4456, Jul.-Aug. 2020. (Year: 2020).*

Sern et al., "TypoSwype: An Imaging Approach to Detect Typo-Squatting," 11th IFIP International Conference on New Technologies, Mobility and Security (NTMS) IEEE published Apr. 2021; 5 pages.

Sern et al., "PhishGAN: Data Augmentation and Identification of Homoglyph Attacks," published Jun. 24, 2020; available at https://arxiv.org/abs/2006.13742v1; 8 pages.

* cited by examiner

SYSTEM AND METHOD FOR DETECTING PHISHING-DOMAINS IN A SET OF DOMAIN NAME SYSTEM (DNS) RECORDS

CROSS-REFERENCE TO RELATED APPLICATIONS

This application claims priority to Singapore Patent Application No. 10202104779P, filed on May 7, 2021 and Singapore Patent Application No. 10202106833S, filed on Jun. 23, 2021, both of which are incorporated by reference in their entirety herein.

FIELD OF THE INVENTION

This invention relates to a system and method for detecting phishing-domains, which are used by cyber-attackers to carry out phishing attacks, through the use of Domain Name System (DNS) records. The system comprises a homoglyph phishing domain detection module, a typo-squatting phishing domain detection module, a general phishing domain detection module and an alert module. These modules are configured to collaboratively detect and identify phishing-domains occurring within a given set of DNS records using a combination of homoglyph, typo-squatting and general phishing domain techniques.

SUMMARY OF PRIOR ART

In general, there are three main types of phishing domains which are typically used to carry out phishing attacks; Homoglyph phishing domains that exploit visual similarity, typo-squatting phishing domains that exploit typo-graphical errors, and other general phishing domains such as "win-free-iPhone[.]com" that exploit human desires. It is useful to note that phishing attacks comprise attacks where attackers attempt to either (1) gather knowledge about victims via credential harvesting or (2) gain initial access by tricking people into downloading and executing malicious payloads.

Typo-squatting phishing domains are a common type of phishing attack that involves the permutation of alphabets of the same Latin characters. Particularly, typo-squatting phishing domains involve registering domains which exploit typographical errors that unsuspecting users may commit when keying in desired domains. For example, in 2006, a typo-squatted variant of "google[.]com", "goggle[.]com" was abused by malicious parties and even more recently, a typo-squatted variant of "youtube[.]com", "yuube[.]com" was used to host malware.

To address such attack types, the current approach that is accepted by those in the industry is to calculate the edit distance between strings. For example, equation (1) below shows two sample domains which are 1 Levenshtein edit Distance (LD) away from the "real" domain name, i.e. "facebook.com". In this known method, it should be noted that a lower LD value indicates domains which are extremely similar to the "real" domain, thereby increasing the possibility of a phishing attempt occurring.

$$ld(\text{"facebook.com"};\text{"face4book.com"})=1$$

$$ld(\text{"facebook.com"};\text{"faceb0ok.com"})=1 \quad \text{Equation (1)}$$

However, this method fails to account for keyboard distance but only considers the heuristics. For example, in Equation (1), "faceb0ok.com" is more likely to be a typo-squatted variant of "facebook.com" because "o" and "0" are very close together while "p" and "c" are extremely far apart on the keyboard. Despite this stark difference, the LD algorithm classifies the two domains to be of equal Levenshtein edit Distance (LD) from "facebook.com". Notwithstanding this, the LD still forms the basis of many modern-day spell-checking systems, making it suitable for detecting typo-squatting phishing domains, which exploit typographical/spelling errors.

In recent times, those skilled in the art have noted the importance of taking into account keyboard distance and are increasingly finding new ways to account for it and come up with better spell-checking algorithms. One skilled in the art proposed a simplistic way of comparing two domain strings by returning the sum of distances between corresponding characters within. If one string is longer than the other, the remaining characters are counted as having the same value as the maximum distance. Although it considers keyboard distance, it fails to take into the transposition of adjacent characters.

Additionally, the Levenshtein edit Distance (LD) method described above fails when the attackers utilize homoglyph attacks (which are a subset of lookalike attacks), which utilizes characters not within the Latin character group. For example, the domains "fácebook.com" and "facebooZ.com" while both are one (1) LD from "facebook.com", they both have different visual characteristics. Furthermore, as most modern browsers support the display of Internationalized Domain Names (IDN), domain names comprising digits and other special characters can all be registered. Such IDNs are typically converted to their Latin character equivalents in the form of "puny codes". Though extremely useful in facilitating domain names of various languages, it opens the possibility of cyberattacks, particularly, homoglyph type domain attacks. The homoglyph attack vector comes into play when there is a mixture of characters that look like their Latin counterparts. As shown in Table 1 below, it is not easy to differentiate the homoglyph type-domains from their original domains.

TABLE 1

| Original | Replaced | Punycode | Visualized |
| --- | --- | --- | --- |
| facebook.com | "a" to "á" | xn-fcebook-hwa.com | fácebook.com |
| google.com | "1" to " ӏ" | xn-googe-nta.com | goog ӏe.com |
| imda.gov.sg | "i" to "1" | xn-mda-iua.gov.sg | 1mda.gov.sg |

As homoglyph phishing attacks have been on the rise, many techniques have been proposed by those skilled in the art to detect such attacks. One approach proposed by those skilled in the art is to study the similarity between single characters and to evaluate their pair wise similarities based on a mean squared error. This study was then fine-tuned by getting humans to evaluate the similarity of such character pairs. A major drawback of this is that the string of words were not taken into account as similarity comparisons was done at a character level. Furthermore, in this approach, it was assumed that a combination of homoglyphs could affect the confusability of homoglyph strings. This approach lacked a sufficiently large training dataset as such, there was the need for human labellers to be used to fine-tune the study.

In another approach, one skilled in the art showed that a Siamese Convolutional Neural Network (CNN) was able to detect and classify homoglyph attacks. This approach utilized a dataset containing pairs of real and spoofed domains renderable in Arial font. Though extremely useful for the purpose of training machine-learning (ML) algorithms, the major drawback of this approach is that it is inherently biased towards only the Arial font. This means that puny code that could be rendered by other fonts are not taken into account in this approach. Deep learning models trained on such a dataset would have a bias towards Arial font. Furthermore, creating a large curated dataset for multiple fonts would be extremely tedious and may not be efficient, as it would again be biased towards only those specific fonts.

In addition to the homoglyph and typo-squatting type domains, there also exists phishing domains that exploit basic human desires. Such domains are the hardest to identify and detect and as such, to this day, there is no widely accepted approach to address such domains. Techniques proposed by those skilled in the art to identify such malicious domains make use of other features such as the life of the domain (i.e. how long the domain is queried for before people stop querying it), number of IP addresses, etc. to determine if a domain is malicious. However, results have shown that such models typically end up catching malware domains and other domains associated with later stages of the attack framework, particularly C2 communication, DNS exfiltration, etc. and in reality, was unable to detect any phishing domains, indicating that such techniques are better suited for detecting malware and malicious domains but not phishing domains, which typically occurs during an earlier stage of the cyber-attack.

For the above reasons, those skilled in the art are constantly striving to come up with a system and method that is capable of detecting phishing domains from a set of DNS records that may comprise either homoglyph phishing domains, typo-squatting phishing domains and/or general phishing domains.

SUMMARY OF THE INVENTION

The above and other problems are solved and an advance in the art is made by systems and methods provided by embodiments in accordance with the invention.

A first advantage of embodiments of systems and methods in accordance with the invention is that the invention is able to detect and arrest early-stage phishing attacks based only on received network traffic data such as DNS records thereby preventing a protected system from being compromised by later-stage attacks such as data exfiltration or credential harvesting.

A second advantage of embodiments of systems and methods in accordance with the invention is that in addition to detecting such domains, the invention is able to enrich alerts relating to the identification of such domains such that other organizations who are also subject to such phishing-domain attacks may be alerted.

A third advantage of embodiments of systems and methods in accordance with the invention is that the invention is able to utilize three types of phishing-domain detection techniques to identify phishing domains.

A fourth advance of embodiments of systems and methods in accordance with the invention is that the invention utilizes a Generative Adversarial Neural Network (GAN), that is trained using a unique loss function, to produce an almost infinite variety of glyphs, not limited to any specific font type, to train a separate homoglyph encoder to help detect and identify homoglyph phishing domains.

A fifth advantage of embodiments of systems and methods in accordance with the invention is that by converting the string comparison problem to an image recognition problem, batch processing may be carried out allowing more strings to be processed quickly thereby allowing large scale network traffic data to be processed.

A sixth advantage of embodiments of systems and methods in accordance with the invention is that keyboard distance is innately accounted for when converting the typo-squatting phishing domain detection to an image recognition problem, via the Swype Image Renderer.

A seventh advantage of embodiments of systems and methods in accordance with the invention is that a Bidirectional Encoder Representations from Transformers (BERT) neural network is used to employ natural language understanding to determine whether a domain is a possible general phishing domain.

A eighth advantage of embodiments of systems and methods in accordance with the invention is that resolved IPs of domains flagged as possible general phishing domains is also used as an additional feature for correlation to determine whether a domain should be classified as a general phishing domain or not, to significantly drive down False Positive rate of general phishing domains detections.

A ninth advantage of embodiments of systems and methods in accordance with the invention is that time and frequency analysis is conducted for each IP that is a victim of phishing to determine if the attack has evolved to a later stage.

The above advantages are provided by embodiments of a method in accordance with the invention operating in the following manner.

According to a first aspect of the invention, a system for detecting phishing-domains in a set of Domain Name System (DNS) records is disclosed, the system comprising: a homoglyph phishing domain detection module comprising a trained homoglyph encoder $E_H$ and a reference database $D_H$, the module being configured to: receive string images, $I_{HT\_N}$, that have been rendered from homoglyph domains, wherein homoglyph domains comprise domains that each comprise puny code; encode, using the trained homoglyph encoder $E_H$, each of the string images $I_{HT\_N}$ into their associated encodings $e_{HT\_N}$; classify each homoglyph domain as a homoglyph phishing domain when an Euclidean distance between an associated encoding $e_{HT\_N}$ and any encoding in the reference database $D_H$ is below a predetermined threshold; a typo-squatting phishing domain detection module comprising a trained typo-squatting encoder $E_S$ and a reference database $D_S$, the module being configured to: receive Swype-like images, $I_{ST\_N}$, of domains that have been rendered from the set of DNS records; encode, using the trained typo-squatting encoder $E_S$, each of the Swype-like images, $I_{ST\_N}$ into their associated encodings $e_{ST\_N}$; classify each domain used to generate the set of Swype-like images, $I_{ST\_N}$, as a typo-squatting phishing domain when an Euclidean distance between an associated encoding $e_{ST\_N}$ and any encoding in the reference database $D_S$ is below a predetermined threshold; a general phishing domain detection module comprising a trained transformer based neural network, the module being configured to: receive domains identified from the set of DNS records to have strings that at least partially match strings in a phishing reference list K; generate, using the trained transformer based neural network, a probability score for each of the identified domains; resolve Internet Protocol (IP) addresses for each identified domain that has a probability score that exceeds a predetermined probability threshold; for each of the resolved IP addresses, obtain all external domains associated with the resolved IP address, wherein external domains refer to all domains within the set of DNS records that resolved to the resolved IP address; generate, using the transformer based neural network, a probability score for each of the obtained external domains; classify each obtained external domain that has a probability score that exceeds the predetermined probability threshold as a general phishing domain; and an alert module configured to produce alerts for phishing-domains detected within the set of DNS records based on the homoglyph-phishing domains from the homoglyph phishing domain detection module, the typo-squatting phishing domains from the typo-squatting phishing domain detection module and the general phishing domains from the general phishing domain detection module.

With regard to the first aspect of the invention, the alert module comprises a blacklist and rule-based filtering module configured to filter out benign domain names from the identified phishing-domains.

With regard to the first aspect of the invention, the alert module further comprises: a behavioural analytics module configured to: obtain from the blacklist and rule-based filtering module unfiltered phishing-domains; obtain IP addresses that queried at least one of the unfiltered phishing-domains; for each IP address that queried at least one of the unfiltered phishing-domains, generate a count-based vector based on the number of queries to each unfiltered phishing-domain made by the IP address; apply a L2 normalization to each count-based vector; apply Hierarchical clustering to the IP addresses and their associated count-based vectors to identify count-based vectors having similar characteristics; and classify IP addresses associated with the identified count-based vectors as IP addresses subjected to the same phishing-attack campaigns.

With regard to the first aspect of the invention, the alert module further comprises: a behavioural analytics module configured to: obtain from the blacklist and rule-based filtering module unfiltered phishing-domains; obtain IP addresses that queried at least one of the unfiltered phishing-domains; for each IP address that queried at least one of the unfiltered phishing-domains, generate a count-based vector based on the number of queries to each unfiltered phishing-domain made by the IP address; apply a L2 normalization to each count-based vector; apply Locality Sensitive Hashing (LSH) to the IP addresses and their associated count-based vectors to identify count-based vectors having similar characteristics; and classify IP addresses associated with the identified count-based vectors as IP addresses subjected to phishing-attack campaigns.

With regard to the first aspect of the invention, the behavioural analytics module further comprises a dimensionality reduction procedure such as TSNE or UMAP prior to hierarchical clustering or LSH.

With regard to the first aspect of the invention, the alert module further comprises: a behavioural analytics module further configured to: obtain from the blacklist and rule-based filtering module unfiltered phishing-domains; obtain IP addresses that queried at least one of the unfiltered phishing-domains; for each IP address that queried at least one unfiltered phishing-domain, collect a list of sorted time stamps of when the queries to the at least one unfiltered phishing-domain was made; compute relative times using the sorted time stamps, wherein each computed relative time being the time elapsed with respect to a first time stamp; bin the computed relative times into a desired sampling frequency and count the number of entries in each bin to obtain a time series of occurrences, wherein the time series of occurrences is defined as the number of queries made to the at least one unfiltered phishing-domain; apply a Hanning filter to the time series of occurrences and conduct frequency analysis on the filtered time series of occurrences to determine presence of periodicity and its associated frequency.

With regard to the first aspect of the invention, the homoglyph encoder $E_H$ is trained by minimizing a triplet loss training function, $L_{triplet}$ with respect to the parameters of the homoglyph encoder $E_H$, and the function $L_{triplet}$, is defined as $$L_{triplet} = \min_E(\max(\|E(A) - E(P)\|^2 - \|E(A) - E(N)\|^2 + M, 0.0)$$

where a Positive input of the function $L_{triplet}$ is provided with a set of images rendered from a set of frequently visited popular Internet domains, an Anchor input of the function $L_{triplet}$ is provided with a set of outputs from a trained Phish-Generative Adversarial Network (Phish-GAN) that each correspond to a glyphed version of the current set's positive input, a Negative input of the function $L_{triplet}$ is provided with a set of string images of domains sampled from the set of frequently visited popular Internet domains deemed by the encoder $E_H$ to be similar to the current set's anchor input but excluding the actual positive sample for that set, and where E(P) is defined as a Positive encoded output, E(A) is defined as an Anchor encoded output, E(N) is defined as a Negative encoded output and M is a margin.

With regard to the first aspect of the invention, the homoglyph encoder $E_H$ is trained by minimizing a Normalized Temperature-scaled Cross Entropy (NT-Xent) loss function $L_{NT-Xent}$, defined as $$L_{NT-Xent} = \min -\left(\log\left[\frac{e^{\frac{s_{a,p}}{\tau}}}{\sum_{n=1}^{b_n} e^{\frac{s_{a,n}}{\tau}}}\right]\right)$$

where a Positive input of the function $L_{NT-Xent}$ is provided with a set of images rendered from a set of frequently visited popular Internet domains, an Anchor input of the function $L_{NT-Xent}$ is provided with a set of outputs from a trained Phish-Generative Adversarial Network (Phish-GAN) that each correspond to a glyphed version of the current set's positive input, a Negative input of the function $L_{NT-Xent}$ is provided with a set of a batch of string images of domains from the set of frequently visited popular Internet domains deemed by the encoder $E_H$ to be similar to the current set's anchor input but excluding the actual positive sample for that set, and where $s_{a,p}$ is the cosine similarity measure between the encodings of the anchor and positive samples and $s_{a,n}$ is the cosine similarity measure between the encodings of the anchor and the negative sample.

With regard to the first aspect of the invention, the trained Phish-GAN comprises: a trained generator, G, configured to receive images x rendered from a training dataset, y, and randomly generated noise, z, to produce glyphed versions, G(x,z) of each of the received images; a trained discriminator, D, configured to: receive the glyphed versions, G(x,z) from the trained generator G, and images x; and classify the images x and G(x,z) into fake or real images via discriminator function D( ), whereby the generator G is trained using an auxiliary dot product loss function, $L_{dot}$ which is defined as:

$$L_{dot} = \text{flat}((G(x,z))) \cdot \text{flat}(x)$$

where flat( ) is defined as a flat function that reshapes image tensors to a vector in order to calculate the dot product, and whereby the trained Phish-GAN comprises generator objective function G* and discriminator objective function D* which are defined as $$G^* = \min_G(\log(D(x)) + \log(1 - D(G(x,z))) + L_{dot})$$

$$D^* = \max_D(\log(D(x)) + \log(1 - D(G(x,z))))$$

With regard to the first aspect of the invention, the typo-squatting encoder $E_S$ is trained by minimizing a Normalized Temperature-scaled Cross Entropy (NT-Xent) loss function $L_{NT\text{-}Xent}$, defined as $$L_{NT-Xent} = \min - \left(\log\left[\frac{e^{\frac{s_{a,p}}{\tau}}}{\sum_{n=1}^{b_n} e^{\frac{s_{a,n}}{\tau}}}\right]\right)$$

where a Positive input of the function $L_{NT\text{-}Xent}$ is provided with a set of Swype-like images rendered from a set of frequently visited popular Internet domains, an Anchor input of the function $L_{NT\text{-}Xent}$ is provided with a set of Swype-like images of generated typo-squatting phishing domains targeting the associated set's positive input, a Negative input of the function $L_{NT\text{-}Xent}$ is provided with a set of a batch of Swype-like images of domains from the set of frequently visited popular Internet domains deemed by the encoder $E_S$ to be similar to the current set's anchor input but excluding the actual positive sample for that set, and where $s_{a,p}$ is the cosine similarity measure between the encodings of the anchor and positive samples and $s_{a,n}$ is the cosine similarity measure between the encodings of the anchor and the negative sample.

With regard to the first aspect of the invention, the typo-squatting encoder $E_S$ is trained by minimizing a Triplet loss function $L_{triplet}$, defined as $$L_{triplet} = \min_E(\max(\|E(A) - E(P)\|^2 - \|E(A) - E(N)\|^2 + M, 0.0))$$

where a Positive input of the function $L_{triplet}$ is provided with a set of Swype-like images rendered from a set of frequently visited popular Internet domains, an Anchor input of the function $L_{triplet}$ is provided with a set of Swype-like images of generated typo-squatting phishing domains targeting the associated set's positive input, a Negative input of the function $L_{triplet}$ is provided with a set of a batch of Swype-like images of domains from the set of frequently visited popular Internet domains deemed by the encoder $E_S$ to be similar to the current set's anchor input but excluding the actual positive sample for that set, and where $E(P)$ is defined as a Positive encoded output, $E(A)$ is defined as an Anchor encoded output, $E(N)$ is defined as a Negative encoded output and M is the margin.

With regard to the first aspect of the invention, wherein the transformer based neural network is trained using a binary cross entropy loss function.

With regard to the first aspect of the invention, wherein the generation of the probability score for each of the identified domains using the general phishing domain detection module comprises the general phishing domain detection module being configured to: conduct sub-word tokenisation on each of the identified domains, and generate, using the trained transformer based neural network, the probability score based on the sub-word tokens.

With regard to the first aspect of the invention, wherein the general phishing domain detection module is further configured to: for each of the resolved IP addresses, obtain all externals domains, where external domains comprise domains that resolved to the IP address, generate, using the trained transformer based neural network, the probability score for each external domain based on the sub-word tokens; and classify all the external domains whose probability score exceeds a predetermined threshold as general phishing domains when it is determined that the percentage of the obtained external domains classified as general phishing domains exceeds a percentage threshold.

With regard to the first aspect of the invention, the classifying of each homoglyph domain as a homoglyph phishing domain by the homoglyph phishing domain detection module comprises the homoglyph phishing domain detection module being instead configured to: classify each homoglyph domain as a homoglyph phishing domain when a cosine similarity between an associated encoding $e_{HT\_N}$ and any encoding in the reference database $D_H$ is above a predetermined threshold; the classifying of each domain used to generate the set of Swype-like images, $I_{ST\_N}$, by the typo-squatting phishing domain detection module comprises the typo-squatting phishing domain detection module being instead configured to: classify each domain used to generate the set of Swype-like images, $I_{ST\_N}$, as a typo-squatting phishing domain when a cosine similarity measure between an associated encoding $e_{ST\_N}$ and any encoding in the reference database $D_S$ is above a predetermined threshold.

With regard to the first aspect of the invention, the homoglyph phishing domain detection module is further configured to: receive string images, $I_{HT\_Nall}$, that have been rendered from all queried domains; encode, using the trained homoglyph encoder $E_H$, each of the string images $I_{HT\_Nall}$ into their associated encodings $e_{HT\_Nall}$; classify each queried domain as a lookalike phishing domain when a similarity metric between an associated encoding $e_{HT\_N}$ and any encoding in the reference database $D_H$ crosses a predetermined threshold.

According to a second aspect of the invention, a method for detecting phishing-domains in a set of Domain Name System (DNS) records using a homoglyph phishing domain detection module comprising a trained homoglyph encoder $E_H$ and a reference database $D_H$, a typo-squatting phishing domain detection module comprising a trained typo-squatting encoder $E_S$ and a reference database $D_S$, a general phishing domain detection module comprising a trained transformer based neural network and an alert module is disclosed, the method comprising: receiving, using the homoglyph phishing domain detection module, string images, $I_{HT\_N}$, that have been rendered from homoglyph domains, wherein homoglyph domains comprise domains that each comprise puny code; encode, using the trained homoglyph encoder $E_H$, each of the string images $I_{HT\_N}$ into their associated encodings $e_{HT\_N}$; classifying, using the homoglyph phishing domain detection module, each homoglyph domain as a homoglyph phishing domain when an Euclidean distance between an associated encoding $e_{HT\_N}$ and any encoding in the reference database $D_H$ is below a predetermined threshold; receiving, using the typo-squatting phishing domain detection module, Swype-like images, $I_{ST\_N}$, of domains that have been rendered from the set of DNS records; encoding, using the trained typo-squatting encoder $E_S$ of the typo-squatting phishing domain detection module, each of the Swype-like images, $I_{ST\_N}$ into their associated encodings $e_{ST\_N}$; classifying, using the typo-squatting phishing domain detection module, each domain used to generate the set of Swype-like images, $I_{ST\_N}$, as a typo-squatting phishing domain when an Euclidean distance between an associated encoding $e_{ST\_N}$ and any encoding in the reference database $D_S$ is below a predetermined threshold; receiving, using the general phishing domain detection module, domains identified from the set of DNS records to have strings that at least partially match strings in a phishing reference list K; generating, using the trained transformer based neural network of the general phishing domain detection module, a probability score for each of the identified domains; resolving, using the general phishing domain detection module, Internet Protocol (IP) addresses for each identified domain that has a probability score that exceeds a predetermined probability threshold; for each of the resolved IP addresses, using the general phishing domain detection module to: obtain all external domains associated with the resolved IP address, wherein external domains refer to all domains within the set of DNS records that resolved to the resolved IP address; generate, using the transformer based neural network, a probability score for each of the obtained external domains; classify each obtained external domain that has a probability score that exceeds the predetermined probability threshold as a general phishing domain; and producing, using the alert module, alerts for phishing-domains detected within the set of DNS records based on the homoglyph-phishing domains from the homoglyph phishing domain detection module, the typo-squatting phishing domains from the typo-squatting phishing domain detection module and the general phishing domains from the general phishing domain detection module.

With regard to the second aspect of the invention, the producing alerts using the alert module comprises: filtering out, using a blacklist and rule-based filtering module, benign domain names from the identified phishing-domains.

With regard to the second aspect of the invention, the producing alerts using the alert module comprises: obtaining, using a behavioural analytics module, from the blacklist and rule-based filtering module unfiltered phishing-domains; obtaining, using the behavioural analytics module, IP addresses that queried at least one of the unfiltered phishing-domains; for each IP address that queried at least one of the unfiltered phishing-domains, using the behavioural analytics module to: generate a count-based vector based on the number of queries to each unfiltered phishing-domain made by the IP address; apply a L2 normalization to each count-based vector; applying, using the behavioural analytics module, Hierarchical clustering to the IP addresses and their associated count-based vectors to identify count-based vectors having similar characteristics; and classifying, using the behavioural analytics module, IP addresses associated with the identified count-based vectors as IP addresses subjected to the same phishing-attack campaigns.

With regard to the second aspect of the invention, the producing alerts using the alert module comprises: obtaining, using a behavioural analytics module, from the blacklist and rule-based filtering module unfiltered phishing-domains; obtaining, using the behavioural analytics module, IP addresses that queried at least one of the unfiltered phishing-domains; for each IP address that queried at least one of the unfiltered phishing-domains, using the behavioural analytics module to: generate a count-based vector based on the number of queries to each unfiltered phishing-domain made by the IP address; apply a L2 normalization to each count-based vector; applying, using the behavioural analytics module, Locality Sensitive Hashing (LSH) to the IP addresses and their associated count-based vectors to identify count-based vectors having similar characteristics; and classifying, using the behavioural analytics module, IP addresses associated with the identified count-based vectors as IP addresses subjected to phishing-attack campaigns.

BRIEF DESCRIPTION OF THE DRAWINGS

The above and other problems are solved by features and advantages of a system and method in accordance with the present invention described in the detailed description and shown in the following drawings.

DETAILED DESCRIPTION

This invention relates to a system and method for detecting phishing-domains, which are used by cyber-attackers to carry out phishing attacks, through the use of Domain Name System (DNS) records. The system comprises a homoglyph phishing domain detection module, a typo-squatting phishing domain detection module, a general phishing domain detection module and an alert module. These modules are configured to collaboratively detect and identify phishing-domains from the set of DNS records using a combination of homoglyph, typo-squatting and general phishing domain techniques. In particular, these modules are configured to utilize Generative Adversarial Neural Networks (GANs), image recognition algorithms, transformer neural networks and/or behavioural based analysis techniques to identify and detect phishing domains and possible phishing campaigns from a set of DNS records.

The present invention will now be described in detail with reference to several embodiments thereof as illustrated in the accompanying drawings. In the following description, numerous specific features are set forth in order to provide a thorough understanding of the embodiments of the present invention. It will be apparent, however, to one skilled in the art, that embodiments may be realised without some or all of the specific features. Such embodiments should also fall within the scope of the current invention. Further, certain process steps and/or structures in the following may not have been described in detail and the reader will be referred to a corresponding citation so as to not obscure the present invention unnecessarily.

Further, one skilled in the art will recognize that many functional units in this description have been labelled as modules throughout the specification. The person skilled in the art will also recognize that a module may be implemented as circuits, logic chips or any sort of discrete component. Still further, one skilled in the art will also recognize that a module may be implemented in software which may then be executed by a variety of processors. In embodiments of the invention, a module may also comprise computer instructions or executable code that may instruct a computer processor to carry out a sequence of events based on instructions received. The choice of the implementation of the modules is left as a design choice to a person skilled in the art and does not limit the scope of this invention in any way.

Figure 1:
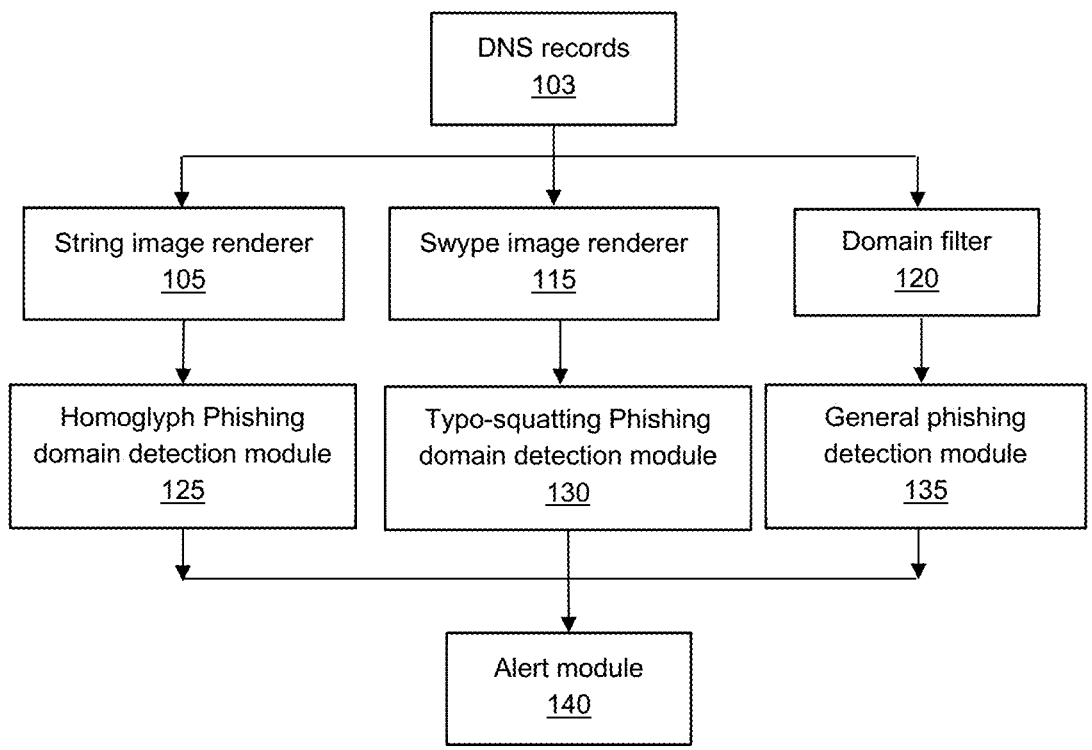
FIG. 1 illustrating a block diagram of modules that may be used to implement the method and/or system for detecting phishing-domains within a set of Domain Name System (DNS) records in accordance with embodiments of the invention.

FIG. 1 illustrates a block diagram of modules that may be used to implement the method and/or system for detecting phishing-domains in a set of Domain Name System (DNS) records in accordance with embodiments of the invention. In general, as illustrated in FIG. 1, a set of DNS records 103 are provided to string image renderer 105, Swype image renderer 115 and Domain filter 120.

String images from string image renderer 105 are then provided to homoglyph detection module 125. Module 125 then proceeds to identify possible homoglyph-phishing domains from the received string images and these identified homoglyph-phishing domains are then provided to alert module 140.

Concurrently, Swype images from Swype image renderer 115 are provided to typo-squatting phishing domain detection module 130. Module 130 then proceeds to identify typo-squatting phishing domains from the received string images and these typo-squatting phishing domains are then provided to alert module 140.

At the same time, strings that are not at least a partial match with strings in a phishing reference list are filtered out at Domain filter 120. The remaining strings are then provided to general phishing detection module 135. Module 135 then proceeds to identify general phishing domains using the remaining strings and these general phishing domains are then provided to alert module 140.

Alert module 140 then utilizes the received homoglyph-phishing domains, the typo-squatting phishing domains and the general phishing domains to identify additional anomalous behaviours and possible similar phishing campaigns affecting multiple IP addresses. Phishing campaigns are essentially attack campaigns carried out by a particular cyber attacker. Alert module 140 correlates the outputs from module 120, 130 and 135 to identify similar phishing behaviours affecting the various IP addresses within the DNS data to identify IP addresses that are experiencing the same phishing campaign, indicating the possibility of them being targeted by the same threat actor.

Before the system illustrated in FIG. 1 is utilized to detect phishing domains in the set of DNS records, the respective modules contained within have to undergo a setup phase. In an embodiment of the invention, a checking list L of commonly used domains, popular domains, and all such similar domains are first generated. String image renderer 105 is then utilized to render string images for each of the domains in checking list L. A trained homoglyph encoder $E_H$, which is provided within homoglyph detection module 125, is then configured to generate encodings for each of the rendered string images. These encodings generated by trained homoglyph encoder $E_H$ are then stored in a reference database $D_H$. In embodiments of the invention, the reference database $D_H$ may be stored within homoglyph phishing domain detection module 125 or may be stored in an external server that is communicatively connected to module 125.

During the setup phase, the checking list L is also provided to Swype image renderer 115. Swype image renderer 115 then renders Swype-like images for each of the domains in checking list L. A trained typo-squatting encoder $E_S$, which is provided within typo-squatting detection module 130, is then configured to generate encodings for each of the rendered Swype-like images. These encodings generated by encoder $E_S$ are then stored in a reference database $D_S$. In embodiments of the invention, the reference database $D_S$ may be stored within typo-squatting detection module 130 or may be stored in an external server that is communicatively connected to module 130.

Additionally, during this setup phase, a list of keywords that are often used in phishing and click-baits are obtained from external databases and records, e.g. the PhishTank database, and used to populate a phishing reference list K.

Once the setup phase has been completed, the system illustrated in FIG. 1 may then be deployed to detect phishing domains in the set of DNS records 103.

String image renderer 105 is firstly configured to render homoglyph domains into a set of string images, $I_{HT\_N}$, where homoglyph domains comprise domains that have puny code present in its domain string, indicating the presence of at least one glyph in its domain string (i.e. non-Latin character). These homoglyph domains comprise domain names from the set of DNS records 103 that each have a sub-domain/domain name that starts with "xn--" which indicates the presence of puny code, implying the presence of a homoglyph. In other embodiments of the invention, string image renderer 105 may be instead configured to render all domain names in the set of DNS records 105 into the set of string images, $I_{HT\_N}$ so that look-alike domains that exploit visual similarity within the Latin family, without the presence of homoglyphs, may also be detected and classified accordingly. Examples of such look-alike domains include replacing "w" with "vv", replacing "l" with "1", etc.

Homoglyph phishing detection module 125, which is provided with the trained homoglyph encoder $E_H$ and the reference database $D_H$, is then configured to receive the set of string images, $I_{HT\_N}$, from string image renderer 105. The trained homoglyph encoder $E_H$, then proceeds to encode each of the string images $I_{HT\_N}$ into their associated encodings $e_{HT\_N}$. These encodings $e_{HT\_N}$ are then compared with encodings contained within reference database $D_H$. If it is found that a Euclidean distance between an associated encoding $e_{HT\_N}$ and any encoding in the reference database $D_H$ is below a predetermined threshold, module 125 will then classify that associated encoding $e_{HT\_N}$ as a homoglyph phishing domain. In other embodiments of the invention, other similarity measures apart from Euclidean distance could also be used. Examples include, cosine similarity, L1 similarity, etc.

In another embodiment of the invention, homoglyph phishing domain detection module 125 may be further configured to receive another set of string images, $I_{HT\_Nall}$, that have been rendered from all queried domains from string image renderer 105. The trained homoglyph encoder $E_H$, then proceeds to encode each of the string images $I_{HT\_Nall}$ into their associated encodings $e_{HT\_Nall}$. These encodings $e_{HT\_Nall}$ are then compared with encodings contained within reference database $D_H$. Each queried domain is then classified as a lookalike phishing domain when a similarity metric, i.e. a Euclidean distance and/or a Cosine similarity, between an associated encoding $e_{HT\_Nall}$ and any encoding in the reference database $D_H$ crosses a predetermined threshold.

Concurrently, Swype image renderer 115 is configured to render the domain names from the set of DNS records 103 into a set of Swype-like images, $I_{ST\_N}$. Typo-squatting detection module 130, which is provided with the trained typo-squatting encoder $E_S$ and the reference database $D_S$ is then configured to receive the set of Swype-like images, $I_{ST\_N}$, from Swype image renderer 115. The trained typo-squatting encoder $E_S$, then proceeds to encode each of the Swype-like images $I_{ST\_N}$ into their associated encodings $e_{ST\_N}$. These encodings $e_{ST\_N}$ are then compared with encodings contained within reference database $D_S$. If it is found that a Euclidean distance between an associated encoding $e_{ST\_N}$ and any encoding in the reference database $D_S$ is below a predetermined threshold; or in other embodiments, if there exists a cosine similarity between an associated encoding $e_{ST\_N}$ and any encoding in the reference database $D_S$ that is above a required matching threshold, module 130 will then classify that associated encoding $e_{ST\_N}$ as a typo-squatting phishing domain. In a further embodiment of the invention, a weighted Damerau Leveshtein Distance algorithm that considers keyboard distance via heuristics may be used to provide further validation of the typo-squatting phishing domains identified by module 130.

In addition to the simultaneous detection of homoglyph and typo-squatting phishing domains, domain filter 120 is configured to filter away domain names from the set of DNS records 103 that do not at least partially contain keywords or phrases from the phishing reference list K. As a result, the remaining domain names would all have strings that at least partially match with strings in the phishing reference list K.

These remaining domain names are then passed through a trained transformer based neural network, which is provided within general phishing domain detection module 135, so that probability scores are generated for each of these remaining domain names. In other words, for each domain name provided, the trained transformer based neural network will classify the probability that the domain is a general phishing domain based on its string's features. For each domain name that has a probability score that exceeds a predetermined probability threshold, the Internet Protocol (IP) address for the domain name will then be resolved. All the resolved IP addresses would then be stored within a set of suspicious resolved IP address {p}. For each IP address contained within set {p}, module 135 then obtains all the corresponding domain names which resolved to the IP address from the set of DNS Records 103, irrespective whether these domain names contain any of the keywords within the phishing reference list K. Each of these domain names are then run through the trained transformer neural network to classify whether the domain name comprises a general phishing domain or not. In other words, for each of the resolved IP addresses, module 135 will obtain all domain names within the set of DNS records 103 that are associated with the resolved IP address (referred to as the external domains); and then to again generate, using the transformer based neural network, a probability score for each of the obtained external domains. External domains that have a probability score that exceeds the predetermined probability threshold are then classified as general phishing domains. In a further embodiment of the invention, external domains whose probability score exceeds the predetermined probability threshold, are only classified as general phishing domains when it is determined that at least a certain percentage of the external domains that resolved to a particular IP address has been deemed to be general phishing domains. E.g. 50% or more of all the domains that resolved to a particular IP address (i.e. external domains that resolved to a particular IP address) must have been flagged as possible phishing domains before the external domains that crossed the predetermined probability threshold are classified as general phishing domains. This acts as an additional check to drive down a False Positive rate. The rationale behind this check is that attackers tend to reuse their infrastructure, especially while attempting phishing attacks so that they may expand their reach without significant additional cost.

Alert module 140 is then configured to provide further analysis on the outputs of the various phishing detection modules 125, 130 and 135 by identifying anomalous phishing behaviours and possible phishing campaigns carried out by sophisticated threat actors attempting phishing on multiple IPs/organisations. Module 140 takes as input all the identified phishing-domains and their victims from the set of DNS records based on the homoglyph-phishing domains received from homoglyph phishing domain detection module 125, the typo-squatting phishing domains received from the typo-squatting phishing domain detection module 130 and the general phishing domains from the general phishing domain detection module 135. Module 140 comprise a blacklist and rule-based filtering module 205 and a behavioural analytics module 210. Filtering module 205 may be configured to further filter away benign domain names that were accidentally picked up from the set of DNS records 103 by phishing detection modules 125, 130 and 135. For example, any domain names ending with ".gov.sg" or "com.sg" could be removed from the possible phishing-domains identified by modules 125, 130 and 135 as domain names that end with these country-specific Top Level Domains (TLDs) have to be officially registered. Hence, the probability of phishing websites being hosted on these TLDs is very low. Behavioural analytics module 210 is then configured to determine, based on the remaining phishing-domains, if phishing attack campaigns are being carried out by malicious parties and whether the phishing-domains exhibit any anomalous temporal behaviours.

Each of the modules described above will be discussed in detail in the later sections.

Figure 2:
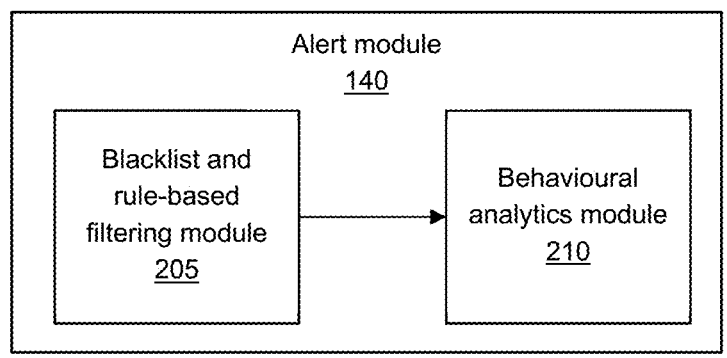
FIG. 2 illustrating a block diagram of modules that may be used to implement another embodiment of the method and/or system for detecting phishing-domains in a set of Domain Name System (DNS) records in accordance with embodiments of the invention.
Figure 3:
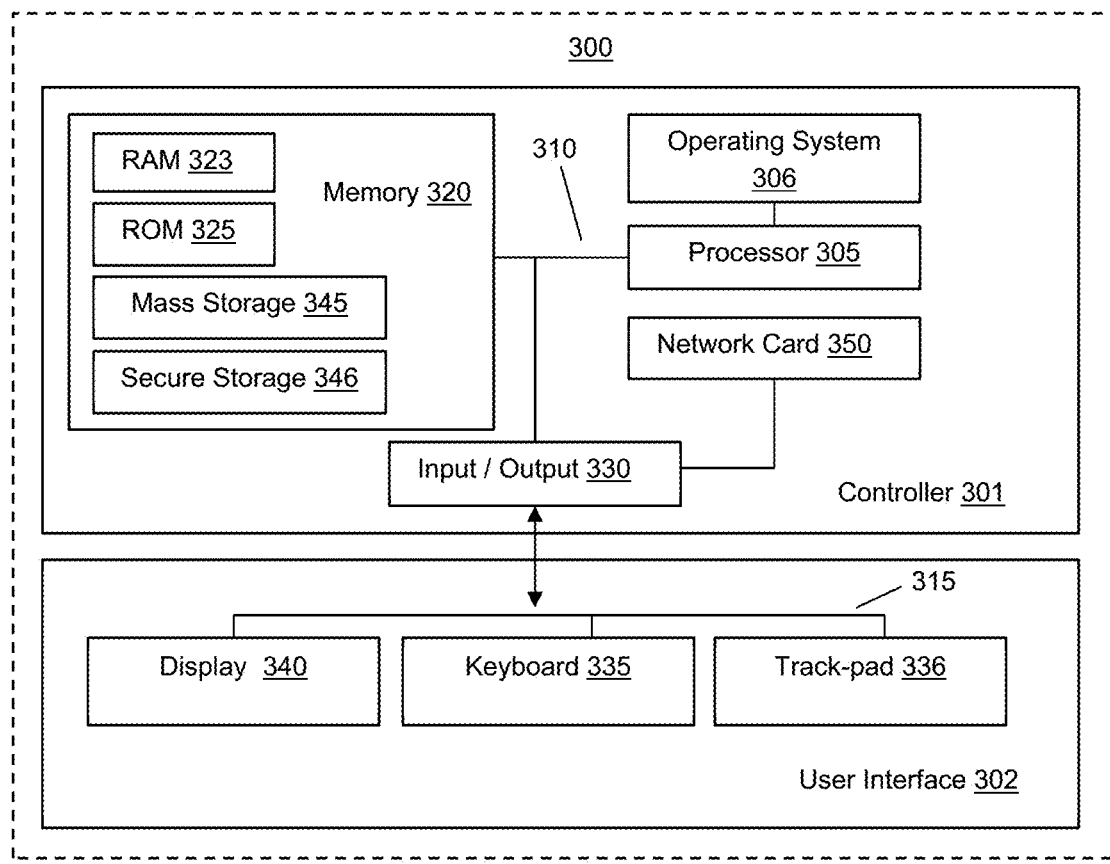
FIG. 3 illustrating a block diagram representative of processing systems providing embodiments in accordance with embodiments of the invention FIG. 4 a process flow of training a Phish-GAN and a homoglyph encoder in accordance with embodiments of the invention.

In accordance with embodiments of the invention, a block diagram representative of components of processing system 300 that may be provided within any of the modules illustrated in FIG. 1 or 2 for implementing embodiments in accordance with embodiments of the invention is illustrated in FIG. 3. One skilled in the art will recognize that the exact configuration of each processing system provided within these modules may be different and the exact configuration of processing system 300 may vary and FIG. 3 is provided by way of example only.

In embodiments of the invention, each of the modules may comprise controller 301 and user interface 302. User interface 302 is arranged to enable manual interactions between a user and each of these modules as required and for this purpose includes the input/output components required for the user to enter instructions to provide updates to each of these modules. A person skilled in the art will recognize that components of user interface 302 may vary from embodiment to embodiment but will typically include one or more of display 340, keyboard 335 and track-pad 336.

Controller 301 is in data communication with user interface 302 via bus 315 and includes memory 320, processor 305 mounted on a circuit board that processes instructions and data for performing the method of this embodiment, an operating system 306, an input/output (I/O) interface 330 for communicating with user interface 302 and a communications interface, in this embodiment in the form of a network card 350. Network card 350 may, for example, be utilized to send data from these modules via a wired or wireless network to other processing devices or to receive data via the wired or wireless network. Wireless networks that may be utilized by network card 350 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 320 and operating system 306 are in data communication with CPU 305 via bus 310. The memory components include both volatile and non-volatile memory and more than one of each type of memory, including Random Access Memory (RAM) 320, Read Only Memory (ROM) 325 and a mass storage device 345, the last comprising one or more solid-state drives (SSDs). Memory 320 also includes secure storage 346 for securely storing secret keys, or private keys. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 320 may include a kernel and/or programming modules such as a software application that may be stored in either volatile or non-volatile memory.

Herein the term "processor" is used to refer generically to any device or component that can process such instructions and may include: a microprocessor, microcontroller, programmable logic device or other computational device. That is, processor 305 may be provided by any suitable logic circuitry for receiving inputs, processing them in accordance with instructions stored in memory and generating outputs (for example to the memory components or on display 340). In this embodiment, processor 305 may be a single core or multi-core processor with memory addressable space. In one example, processor 305 may be multi-core, comprising—for example—an 8 core CPU. In another example, it could be a cluster of CPU cores operating in parallel to accelerate computations.

Figure 4:
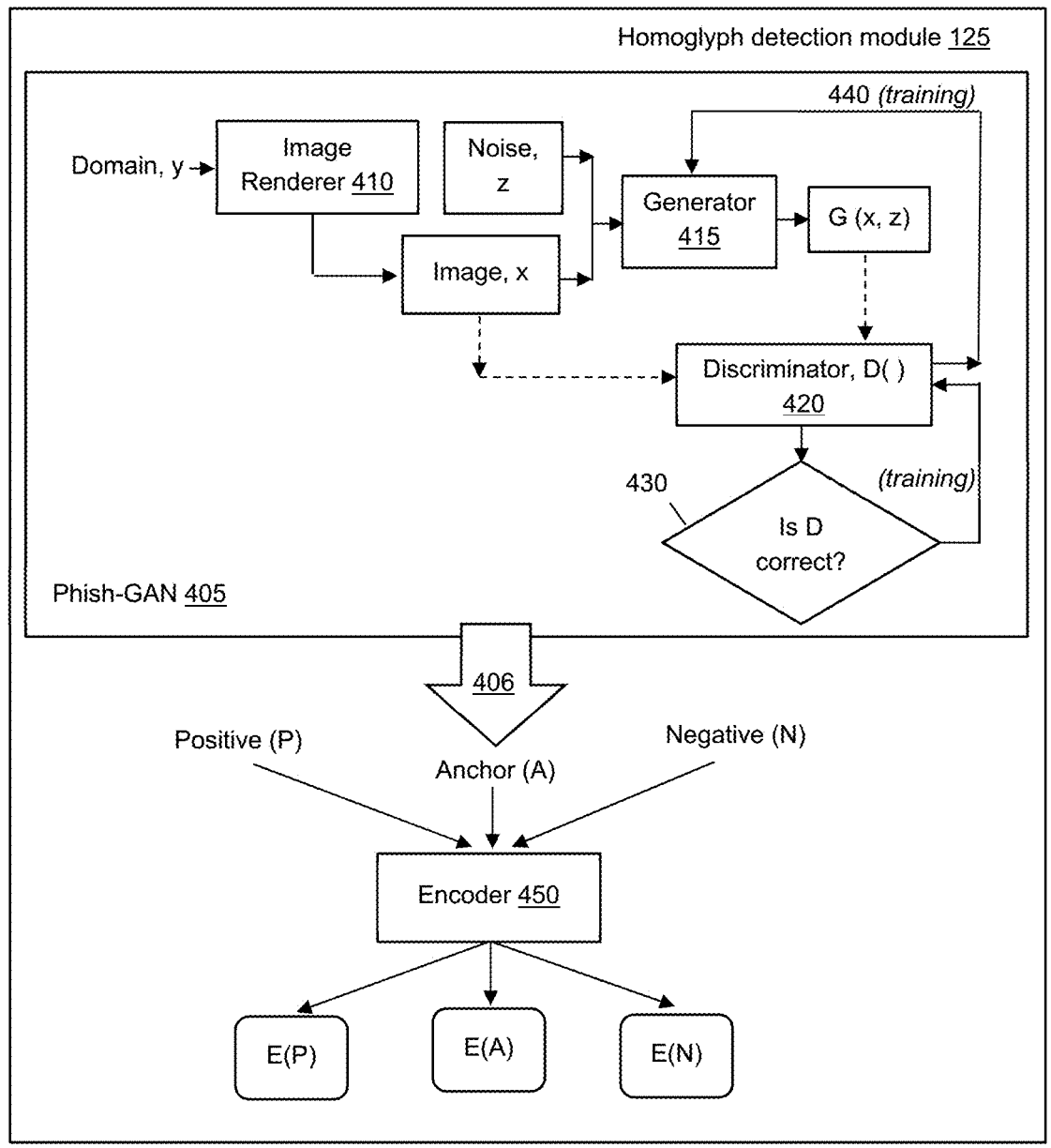

In general, homoglyph detection module 125 comprises a homoglyph encoder $E_H$, trained via a trained conditional Generative Adversarial Network (GAN) labelled as Phish-GAN that is configured and trained to generate an infinite dataset of homoglyphs based on multiple fonts, and a reference database $D_H$, which was generated during the setup phase. The process flows for the training of Phish-GAN 405 and homoglyph encoder $E_H$, i.e. encoder 450, are illustrated in FIG. 4.

Figure 5:
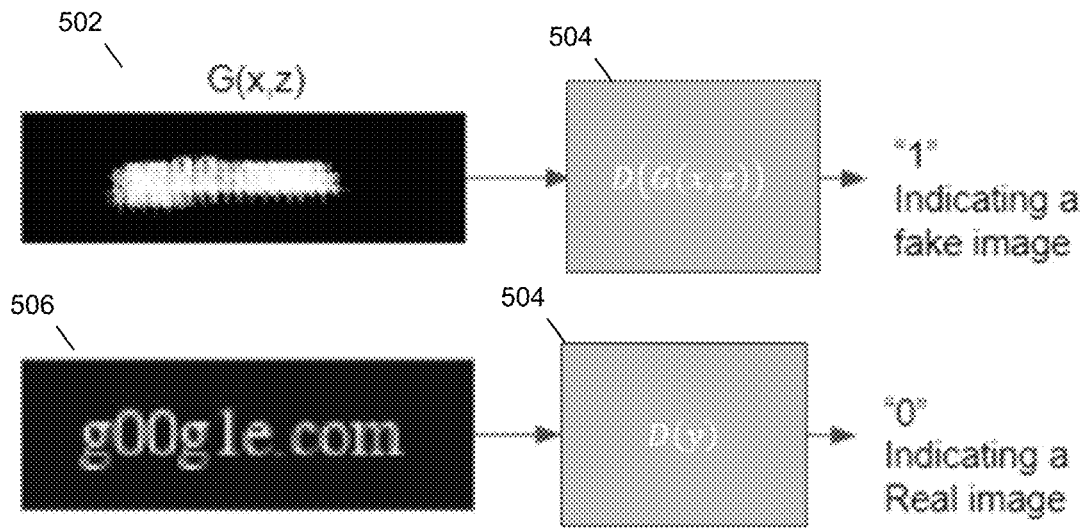
FIG. 5 illustrating exemplary outputs of a Discriminator of the Phish-GAN when a fake image and a real image is provided to the Discriminator.

The architecture of Phish-GAN 405 is generally based on the Pix2Pix network architecture with certain novel changes being made to its loss function and network architecture. As illustrated in FIG. 4, it can be seen that the main components in Phish-GAN 405 are Generator Neural Network 415 and Discriminator 420, D( ). During the initial stage, as generator 415 has not yet been trained, its output would initially comprise only noise, regardless of its inputs. In embodiments of the invention, generator 415 may comprise, but is not limited to, a UNet architecture with skip connections connecting the down-sampling and up-sampling layers. Discriminator 420 may comprise, but is not limited to, a classifier convolutional neural network that is configured to learn to classify whether an input image is a real image or a fake image, i.e. a Phish-GAN/GAN generated image. An exemplary workflow of discriminator 420 is illustrated in in FIG. 5. When a glyphed image 502 is provided to discriminator 504, discriminator 504 should ideally produce an output showing that the image was a fake image. Conversely, when a real image 506 is provided to the same discriminator 504, discriminator 504 should ideally produce an output showing that the image is a real image.

In order to train Phish-GAN 405, an open source dataset y comprising domains and their possible lookalikes was used. The entire dataset y is then provided to image renderer 410, which is configured to render strings of multiple Fonts into images, x. The rendered images, x, of the dataset, and some randomly generated noise, z are then provided to Generator Neural Network 415. Generator 415 uses the received rendered images, x and randomly generated noise, z to produce glyphed versions G(x, z) of each of the rendered images, x. The glyphed versions G(x, z) and rendered images x are then provided to discriminator 420. Discriminator 420 then attempts to determine real images and fake images based on the data provided. The outputs generated by discriminator 420 are compared at training step 430 to determine if discriminator 420 was successful in identifying real images and fake images and the results from step 430 are then provided to discriminator 420 to train it. The outputs from discriminator 420 is then fed back to generator 415 to train it in an adversarial manner (i.e. the generator's training loss would be low if discriminator 420 is fooled to believe that a particular GAN generated input image is a real image and vice versa) via training step 440.

In embodiments of the invention, a dot product loss function $L_{dot}$, may be used as an auxiliary loss at step 440 to train generator 415, where the dot product loss $L_{dot}$ is defined as:

$$L_{dot} = \text{flat}((G(x,z))) \cdot \text{flat}(x)$$

where flat( ) is defined as a "flat function" that reshapes image tensors to a vector in order to calculate the dot product. It is found that such a loss function is useful in preserving the style of an image.

The generator objective function G* may then be defined as:

$$G^* = \min_G(\log(D(x)) + \log(1-D(G(x,z))) + L_{dot})$$

where (log(D(x))+log (1−D(G (x, z))) is the typical generator adversarial loss which is inversely proportional to how well the discriminator performed, and the discriminator objective function D* may then be defined as:

$$D^* = \max_D(\log(D(x)) + \log(1-D(G(x,z))))$$

where (log(D(x))+log (1−D(G(x, z)))) is defined as the typical discriminator adversarial loss, which is inversely proportional to how well the generator performed.

Once Phish-GAN 405 has been trained, its outputs 406 may then be used to train encoder 450.

In embodiments of the invention, encoder 450 may comprise, but is not limited to, a Convolutional Neural Network (CNN). In embodiments of the invention, a contrastive loss function, such as, but is not limited to, a Triplet loss technique, as illustrated in the lower half of FIG. 4, may be utilized to train encoder 450. The Triplet loss technique in general comprise of three inputs: a Positive (P) input, an Anchor (A) input and a Negative (N) input; and three outputs: a Positive encoding E(P), a Negative encoding E(N), and an Anchor encoding E(A).

In this embodiment of the invention, for the training of encoder 450, a dataset comprising the most popular domains are used as the positive (P) input, the outputs from Phish-GAN 405 are used as the anchor (A) input (whereby the dataset comprising the most popular domains were provided as the input to Phish-GAN 405), and a random sample of domains deemed by encoder 450 to be most similar to the corresponding anchor input (A) but excluding corresponding positive input (P) is provided as the negative (N) input. In other words, it can be said that the positive input (P) comprises the example the anchor input (A) was trying to mimic from the dataset comprising the most popular domains, while the negative sample is sampled randomly from the list of domains that are most similar (as deemed by encoder 450) to the anchor input (A) but excluding positive input (P). The Triplet loss $L_{triplet}$ may be defined as:

$$L_{triplet} = \min_E(\max(\|E(A) - E(P)\|^2 - \|E(A) - E(N)\|^2 + M, 0.0)$$

where we minimise the maximum of $\|E(A)-E(P)\|^2-\|E(A)-E(N)\|^2+M$ and 0. M is defined as the Margin. It is clear from the equation that minimising the Triplet loss $L_{triplet}$ is equivalent to ensuring that the distance between E(A) and E(P) is at least smaller than the distance between E(A) and E(N), with a margin of M. If it is more, the loss would be zero and it would not affect the training of encoder 450. In this way, encoder 450 is trained to output encodings that are similar for the positive and anchor inputs and at the same time, encodings that are dissimilar for the anchor and negative inputs with a margin of at least M. In other embodiments of the invention, other similarity loss functions could also be used as the similarity function for the Triplet loss. In other embodiments, the NT-Xent loss together with the cosine similarity loss function could be used to train the encoder.

Figure 6:
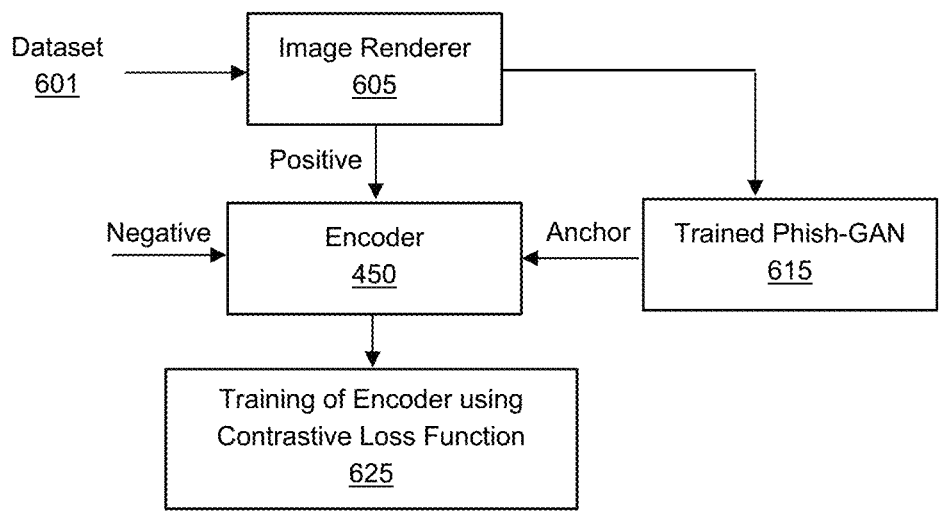
FIG. 6 illustrating the process flow of the training of a homoglyph encoder in accordance with embodiments of the invention.

FIG. 6 illustrates a workflow showing how encoder 450 may be trained in accordance with embodiments of the invention. Dataset 601 comprises a dataset having the most popular domains and this dataset is provided to image renderer 605. Rendered images of strings in dataset 601 are then provided to trained Phish-GAN 615 and also as the Positive (P) inputs to encoder 450. The glyphed outputs from trained Phish-GAN 615 are then provided to encoder 450 as its Anchor (A) inputs. Random samples of domains obtained from dataset 601, deemed by encoder 450 to be similar to the anchor (A) (excluding the positive sample provided to the Positive (P) input) are then provided as the negative (N) inputs to encoder 450. The encodings E(P), E(A) and E(N) together with all the provided inputs are then all used by the contrastive loss function to train encoder 450.

Figure 7:
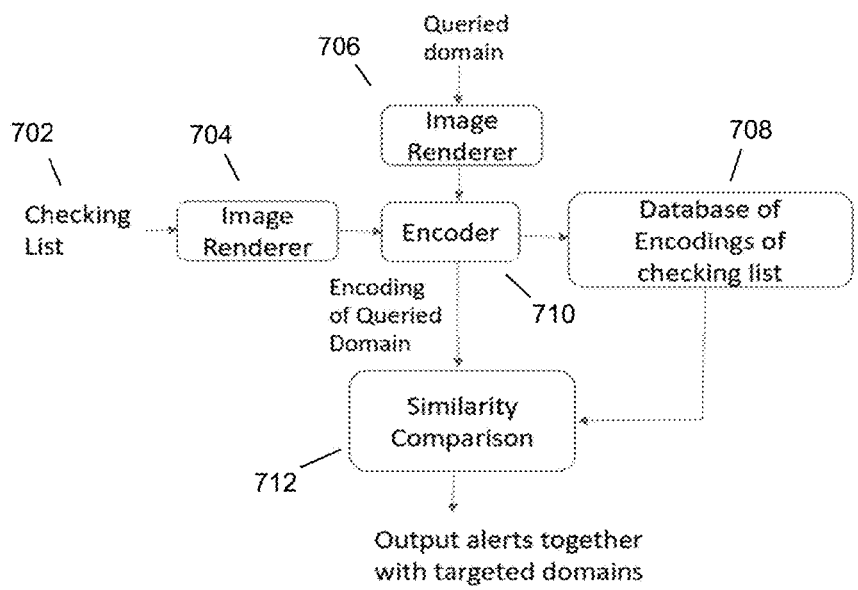
FIG. 7 illustrating the process flow carried out by a homoglyph phishing domain detection module in accordance with embodiments of the invention.

Once trained, trained encoder 450 may then be utilized to produce encodings for queried domains and domains as contained within a dataset of popular domains. If the Euclidean distance between the encoding of the queried domain and any of the encodings of domains in the dataset is less than a particular threshold, the queried domain is classified as a homoglyph-phishing domain and the "targeted" domain (i.e. the domain that the homoglyph was trying to mimic) is then determined to be the domain in the dataset whose encoding has the smallest Euclidean distance to the queried domain's encoding. This workflow is illustrated in FIG. 7.

Checking list 702 comprises a list of popular domains as generated by various external databases. Rendered images of domains from checking list 702 are then generated by image renderer 704 and provided to trained encoder 710. Trained encoder 710 then provides the encodings of checking list 702 to database 708.

When a queried domain is provided to image renderer 706, which is actually the same module as image renderer 704, image renderer 706 then renders an image of the queried domain. The rendered image of the queried domain is then provided to trained encoder 710. Trained encoder 710 then produces an encoding of the queried domain. A similarity comparison of the encoding of the queried domain is then carried out with the encodings in database 708 at step 712. If the Euclidean distance between the encoding of the queried domain and any of the encodings of domains in the database is less than a particular threshold (this should theoretically be the margin M), the queried domain is then classified as a homoglyph-phishing domain and an alert with its "targeted" domain is then produced. The "targeted" domain (i.e. the domain that the homoglyph was trying to mimic) is the corresponding domain in database 708 whose encoding has the smallest Euclidean distance to the queried domain's encoding.

In other embodiments of the invention, a hashing algorithm such as the Locality Sensitive Hashing algorithm could be applied on the encodings of the domains in the checking list and the encodings of the queried domain to quickly filter away domains whose encodings are clearly different from that of the queried domain. This can significantly speed up the search for similar domains.

Figure 8:
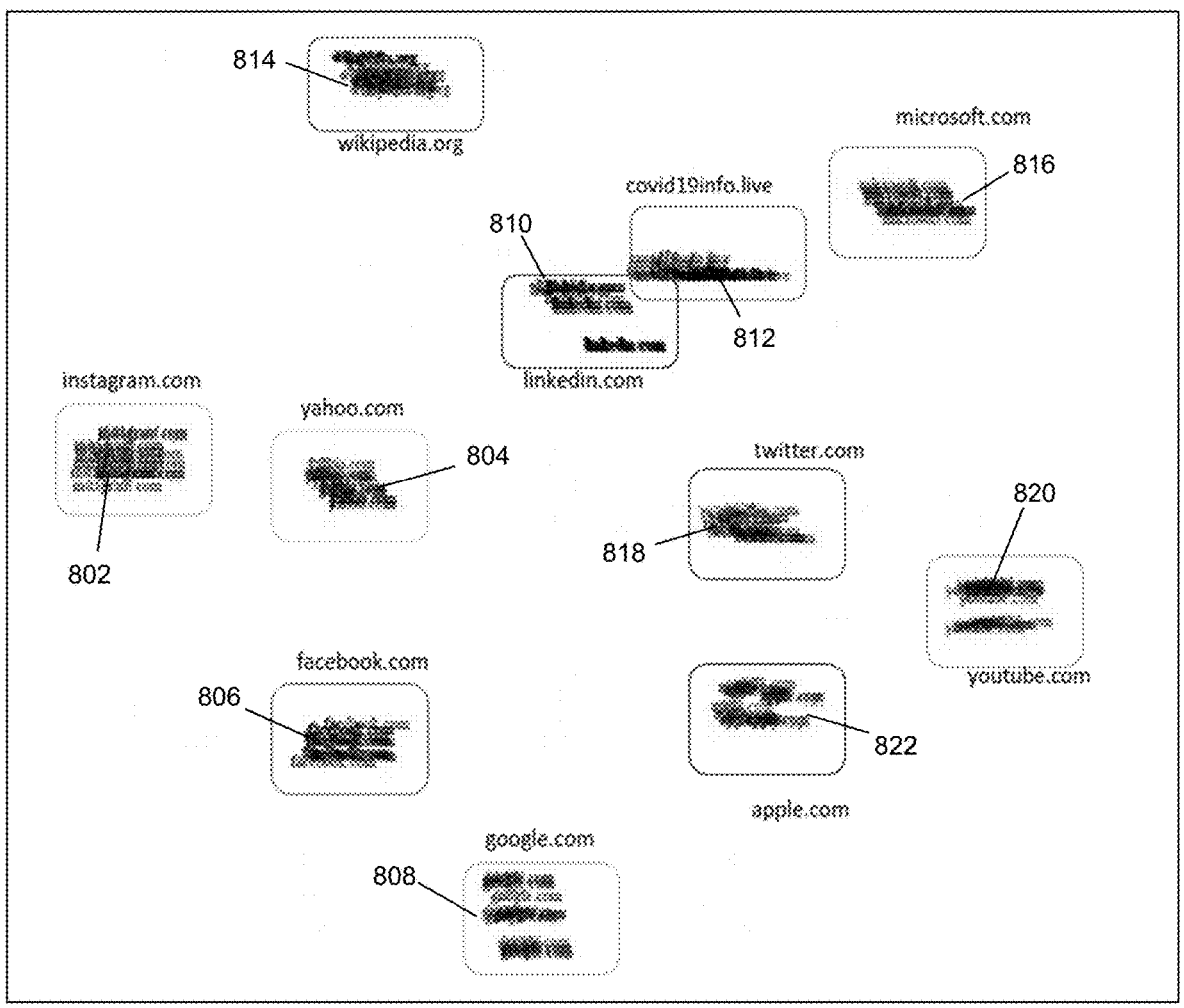
FIG. 8 illustrating encodings produced by the trained homoglyph encoder as projected on a low dimensional visualization plane in accordance with embodiments of the invention.

Dimensionality reduced exemplary encodings of homoglyph-phishing domains (of popular domains), as obtained from the output of the trained encoder, along with their related 'targeted' domain are plotted in FIG. 8. In particular, homoglyph-phishing domains 802 are associated with its targeted domain 'instagram.com', homoglyph-phishing domains 804 are associated with its targeted domain 'yahoo.com', homoglyph-phishing domains 806 are associated with its targeted domain 'facebook.com', homoglyph-phishing domains 808 are associated with its targeted domain 'google.com', homoglyph-phishing domains 810 are associated with its targeted domain linkedin.com', homoglyph-phishing domains 812 are associated with its targeted domain 'covid19info.live', homoglyph-phishing domains 814 are associated with its targeted domain 'wikipedia.org', homoglyph-phishing domains 816 are associated with its targeted domain 'microsoft.com', homoglyph-phishing domains 818 are associated with its targeted domain 'twitter.com', homoglyph-phishing domains 820 are associated with its targeted domain 'youtube.com', and homoglyph-phishing domains 822 are associated with its targeted domain apple.com'.

Concurrently, as DNS records 105 are being rendered by string image renderer 105, DNS records 105 will also be rendered by Swype image renderer 115 into Swype-like images. Swype image renderer 115 does this by rendering Swype-like images based on the QWERTY keyboard layout as this layout is the most widely adopted keyboard format. In embodiments of the invention, this is done by mapping each character in a string to a grid location based on its physical location on the QWERTY keyboard. For example, the character "q" is mapped to grid [1; 0] as it is located on the second row and first column of the QWERTY keyboard. To ensure that lines are separated and not right on top of each other, a small amount of noise is added to each keyboard position corresponding to each character in the string. In this embodiment, a random uniform noise between 0 and 0.1 was added for both axis. This corresponds to 10% of a key on the keyboard as each key on the keyboard was defined as having a length and height of 1. Next, to take into account the sequence of characters in a string of text, a pre-set sequence of colours was used (although other identification methods may be also be used). For example, the first stroke between the 1st and 2nd character will always be blue, the next stroke between the 3rd and 4th character will always be light blue, etc. Finally, the corresponding location of the keys (together with noise) on the 4×10 grid, corresponding to the QWERTY keyboard, is multiplied by a factor of 10 and rendered into a 40×100 image via the Python Pillow package.

Figure 9:
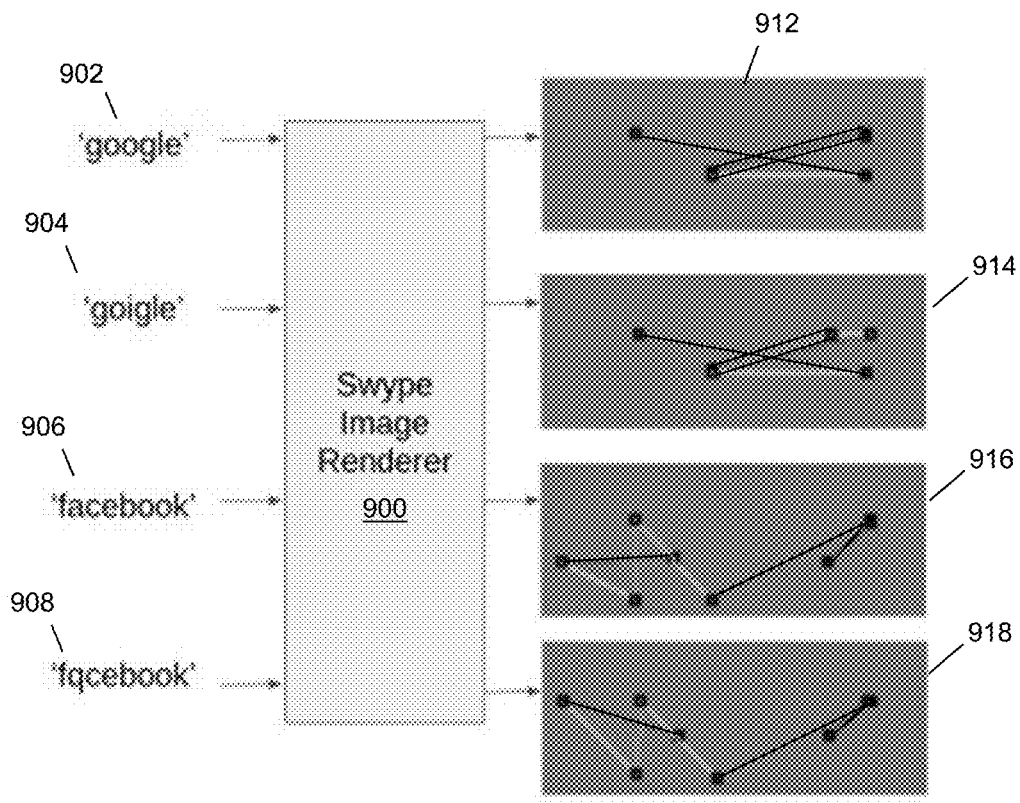
FIG. 9 illustrating exemplary Swype rendered images of domain names in accordance with embodiments of the invention.

FIG. 9 illustrates two examples of popular domains, i.e. domains 902 and 906; and two possible typo-squatting variants, i.e. variants 904 and 908. As can be seen, through the use of Swype image renderer 900, the Swype-like images of the two domains, 912 and 916; are similar to the Swype-like images of corresponding typo-squatting variants 914 and 918 respectively. This occurs for domain 902 and its variant 904, as "o" and "i" are right beside each other on the keyboard. Hence, the difference between the Swype-like images of "google" 912 and "goigle" 914 are almost imperceptible. Similarly, for domain 906 and its variant 908, "a" and "q" are just beside each other on the keyboard, hence the Swype-like render of "facebook" 916 and "fqcebook" 918 are nearly identical as well.

Figure 10:
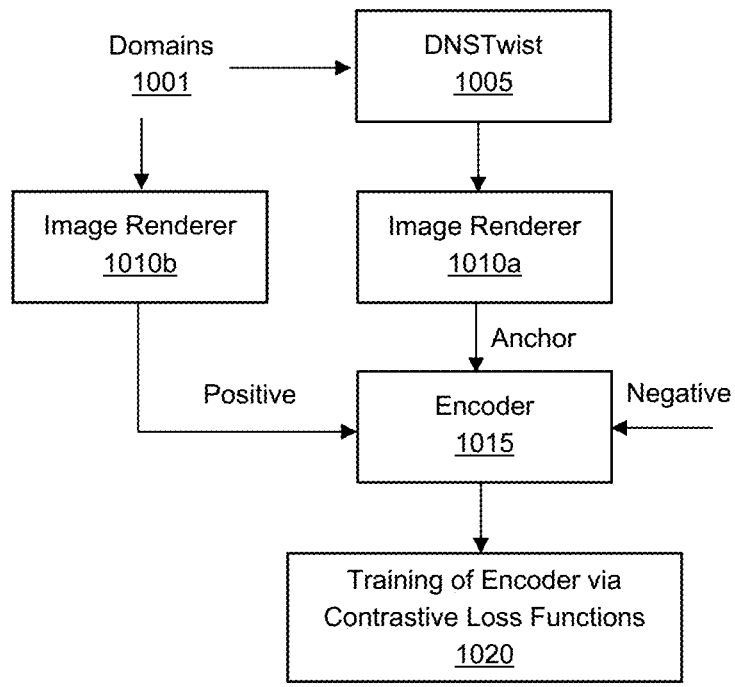
FIG. 10 illustrating the process flow of the training of a typo-squatting encoder in accordance with embodiments of the invention.

In general, typo-squatting detection module 130 comprises a trained typo-squatting encoder $E_S$ and reference database $D_S$ (which was generated as previously described above). With reference to FIG. 10, encoder $E_S$ 1015 may be trained using contrastive loss functions such as, but not limited to, the Triplet loss function (as described in the previous section) or the Normalized Temperature-scaled Cross Entropy (NT-Xent) loss function so that encoder 1015 may produce encodings that are similar for domains and their typo-squatting variants, and dissimilar encodings for domains and their non-typo-squatting variants. Using the same methodology that was used to the train the homoglyph encoder $E_H$, which may comprise, but is not limited to, a CNN, actual domains are provided as the Positive (P) input, typo-squatting variants are provided as the Anchor (A) input and non-typo-squatting variants as deemed by encoder 1015 to display similar visual characteristics to the anchor (A) are provided as the Negative (N) input to encoder 1015.

In this embodiment of the invention, the NT-Xent loss function was used to train encoder 1015. The NT-Xent loss function makes use of cosine similarity, $s_{i,j}$ in place of Euclidean distance. It also makes use of the cross-entropy loss to train the encoder. One advantage of this approach over the Triplet loss is that instead of simply sampling a single negative, a batch of negatives can be used to train the model at one shot. In this embodiment, the top 8 samples closest to the Anchor (as deemed by encoder 1015) and excluding the positive sample were used as the Negative samples. The cosine similarity between input vectors $s_j$ and $s_{i,j}$ may be defined as:

$$s_{i,j} = \frac{s_i^T s_j}{\|s_i\| \|s_j\|}$$

where $s_i^T$ is defined as the transpose of input vector S. The numerator is essentially a dot product and the denominator is normalising the numerator to have a magnitude of 1 so that the output can be interpreted as the cosine of the angle between the 2 input vectors The NT-Xent loss function, $L_{NT-Xent}$ may then be defined as:

$$L_{NT-Xent} = \min - \left( \log \left[ \frac{e^{\frac{s_{a,p}}{\tau}}}{\sum_{n=1}^{b_n} e^{\frac{s_{a,n}}{\tau}}} \right] \right)$$

where $s_{a,p}$ is the cosine similarity between the anchor and the positive, $s_{a,n}$ is the cosine similarity between the anchor and a particular negative sample and $\tau$ is the temperature to scale the loss.

In particular, encoder 1015 is trained to output meaningful embeddings that can be used to detect typo-squatting phishing domains. An exemplary CNN architecture for encoder 1015 is illustrated in Table 2 below.

TABLE 2

| Filters | Stride | Kernel | Convolution Type | Padding | Activation |
|---------|--------|--------|------------------|---------|------------|
| 8 | [1, 1] | [3, 3] | Conv2D | Same | leaky ReLu |
| 16 | [1, 1] | [3, 3] | Conv2D | Same | leaky ReLu |
| 64 | [1, 1] | [3, 5] | Conv2d | Valid | leaky ReLu |
| 64 | [1, 2] | [3, 5] | Conv2d | Valid | leaky ReLu |
| 128 | [2, 2] | [3, 5] | Conv2d | Valid | leaky ReLu |
| 128 | [2, 2] | [3, 5] | Conv2d | Valid | leaky ReLu |
| 128 | [2, 2] | [3, 5] | Conv2d | Valid | leaky ReLu |
| 1024 | — | — | Dense | — | tanh |
| 512 | — | — | Dense | — | leaky ReLu |
| 256 | — | — | Dense | — | l2 norm |

The first two layers with same padding are important to ensure that information at the edges of the image are preserved. The outputs of the final layer are L2 normalised so that every embedding has a magnitude of 1. This is done so that both the Triplet loss (TL) and NT-Xent loss (NL) can be used to train the model. In particular, setting the embeddings to have an L2 norm of 1 would mean that minimising the Euclidean distance between anchor and positive pairs as per the TL loss formulation would be equivalent to maximising cosine similarity, since the squared Euclidean distance between normalized vectors is inversely proportional to their cosine similarity.

With reference to FIG. 10, domains 1001, which comprised the top 20 k domains in the majestic million domains as obtained from external databases were provided to DNSTwist 1005 and image renderer 1010b. DNSTwist 1005 then proceeded to generate samples of typo-squatting phishing domains for domains 1001. In particular, DNSTwist 1005 permutated each of the domain names in domains 1001 to produce possible typo-squatting phishing domains based on a predefined set of rules that cyber-attackers tend to use. The domains produced by DNSTwist 1005 also takes into account keyboard distance by having an allowable dictionary for each key to be permuted. Additionally, it should be noted that the dataset produced is biased toward small edit distances (≤2). In summary, the dataset generated by DNSTwist 1005 will contain a total of approximately two million possible phishing domains, whereby each of these possible phishing domains are derived from one of the domain names in domains 1001.

This dataset generated by DNSTwist is then provided to image renderer 1010a (essentially the same as image renderer 1010b) which proceeds to render domains in this dataset to Swype-like images that are used as the Anchor (A) input for encoder 1015. Concurrently, Swype-like images rendered by image renderer 1010b of domains 1001 are provided as the Positive (P) input for encoder 1015. Non-typo-squatting variants that are deemed by encoder 1015 to be similar to the anchor but aren't the positive sample are then provided as the Negative (N) input for encoder 1015. Upon receiving all these inputs, encoder 1015 then utilizes contrastive loss functions such as the Triplet loss function or the NT-Xent loss function to train encoder 1015 at step 1020.

Figure 11:
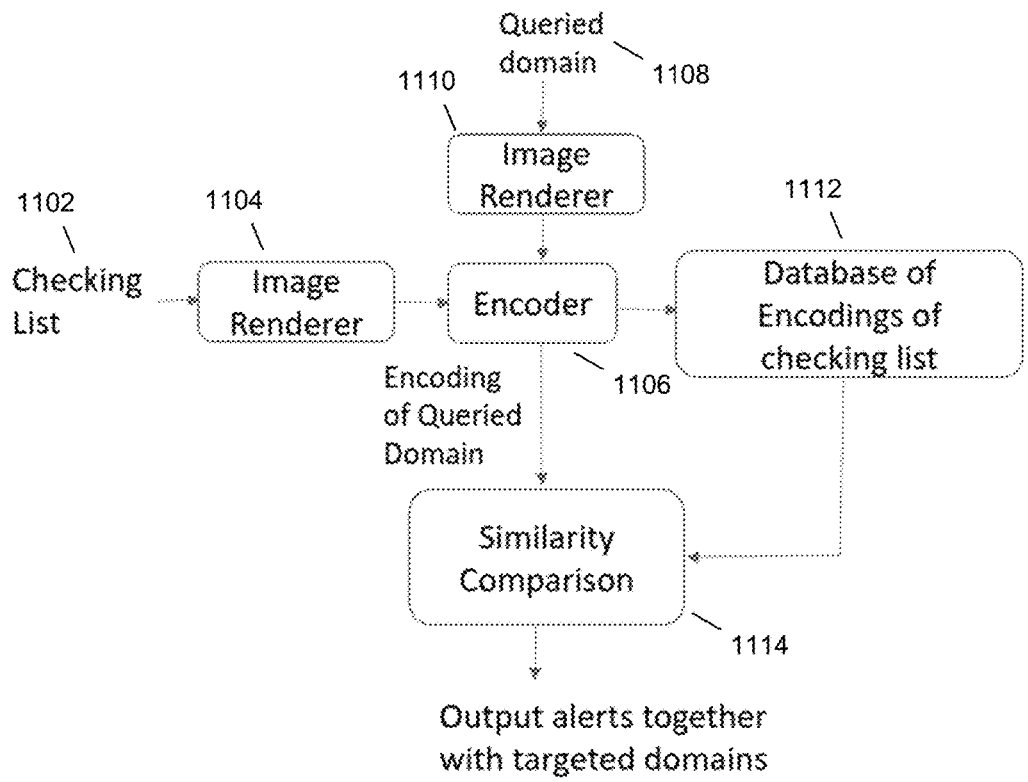
FIG. 11 illustrating the process flow carried out by a typo-squatting phishing domain detection module in accordance with embodiments of the invention.

Once trained, encoder 1015 may be used to produce encodings for both the corresponding Swype-like images of the queried domain and domains in a checking list, which may comprise the top 20 k domains of the majestic million dataset. If the similarity score, which in this case is the cosine similarity score between the encoding of the queried domain and any of the encodings of domains in the checking list is greater than a particular threshold, the domain is then classified as a typo-squatting phishing domain and the targeted domain (i.e. the domain that the typo-squat was trying to mimic) is the one in the checking list whose encoding has been deemed to be most similar to the queried domain's encoding. The flow chart showing this process is illustrated in FIG. 11.

Checking list 1102 comprises a list of popular domains as generated by various external databases. Swype-like images of domains from checking list 1102 are rendered by image renderer 1104 and provided to trained encoder 1106. Trained encoder 1106 then provides the encodings of checking list 1102 to database 1112.

When a queried domain 1108 is provided to image renderer 1110, image renderer 1110 renders a Swype-like image of queried domain 1108. The rendered image of queried domain 1108 is then provided to trained encoder 1106. Trained encoder 1106 then produces an encoding of the queried domain. A similarity comparison of the encoding of the queried domain is then carried out with the encodings in database 1112 at step 1114. If the cosine similarity (or Euclidean distance) between the encoding of the queried domain and any of the encodings of domains in the dataset is more (or less in the case of Euclidean distance) than a particular threshold, the queried domain is then classified as a typo-squatting phishing domain and an alert with its "targeted" domain is then produced. The "targeted" domain (i.e. the domain that the homoglyph was trying to mimic) is the corresponding domain in database 1112, whose encoding has the greatest cosine similarity (or smallest Euclidean distance) to the queried domain's encoding.

Figure 12:
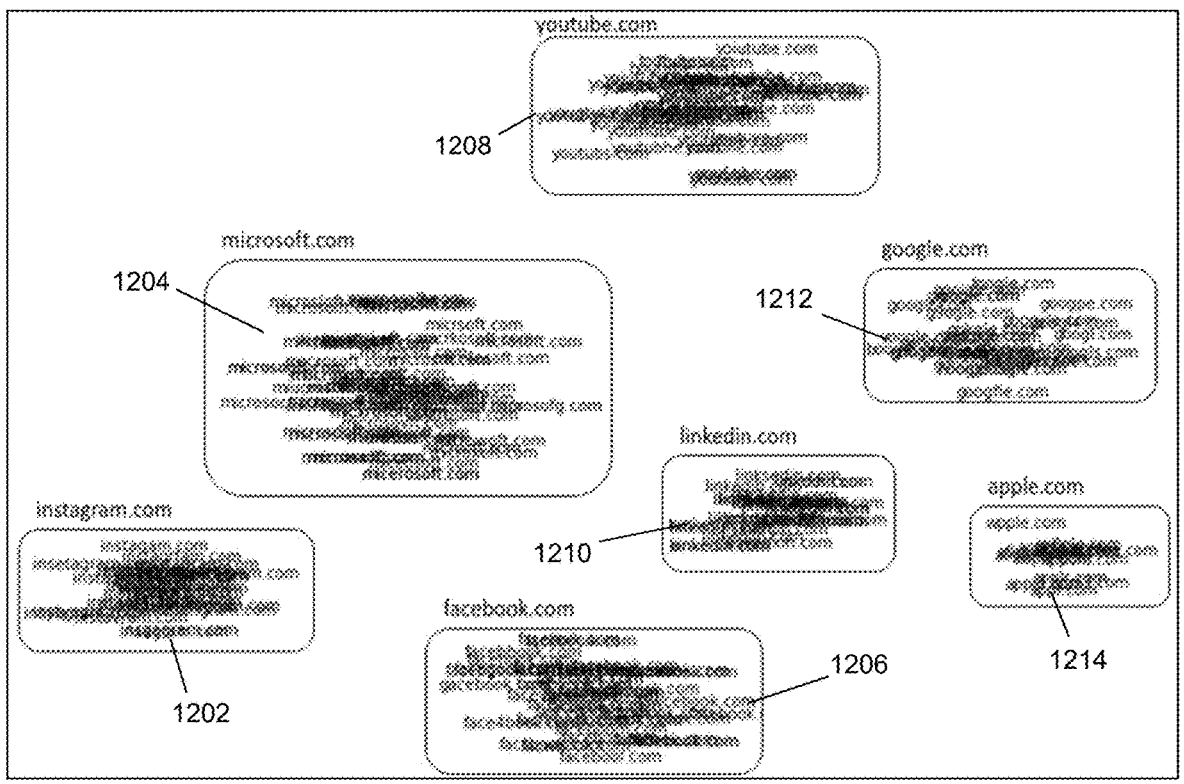
FIG. 12 illustrating clusters of domains and their typo-squatting variants as encoded by the trained typo-squatting encoder and projected on a low dimensional visualization plane in accordance with embodiments of the invention.

Dimensionality reduced exemplary encodings of typo-squatting phishing domains (of popular domains), as obtained from the output of the trained encoder, along with their related 'targeted' domain are plotted in FIG. 12. In particular, typo-squatting phishing domains 1202 are associated with its targeted domain 'instagram.com', typo-squatting phishing domains 1204 are associated with its targeted domain 'microsoft.com', typo-squatting phishing domains 1206 are associated with its targeted domain 'facebook.com', typo-squatting phishing domains 1208 are associated with its targeted domain 'youtube.com', typo-squatting phishing domains 1210 are associated with its targeted domain 'linkedin.com', typo-squatting phishing domains 1212 are associated with its targeted domain 'google.com', and typo-squatting phishing domains 1214 are associated with its targeted domain 'apple.com'.

In embodiments of the invention, a weighted Damerau-Levenshtein Distance (DLD) algorithm may be implemented to calculate the edit distance, weighted by keyboard distance, between the queried domain and the identified targeted domain. This algorithm is able to provide additional enriching information and also acts as a verification step to show that both the neural network and the conventional DLD based algorithm are providing the same results.

In other embodiments of the invention, a hashing algorithm such as the Locality Sensitive Hashing (LSH) algorithm could be applied on the encodings of the domains in the checking list and the encodings of the queried domain to quickly filter away domains whose encodings are clearly different from that of the queried domain. This can significantly speed up the search for similar domains. In one such experiment, the LSH algorithm managed to speed up the search by 12-times.

Homoglyph detection module 125 and typo-squatting detection module 130 are configured to detect and identify domains that tries to mimic legitimate domains. Unlike these two modules, general phishing detection module 135 is configured to detect general phishing domains that exploit human weaknesses. Examples of such domains include, but are not limited to, "watch-this[.]live", "get-free-airtickets[.]live", "celeb-secret[.]online", etc. These domains do not aim to mimic any particular domain but rather try to tempt people into clicking on them, thereby facilitating phishing, malware propagation, etc. In other words, general phishing module 135 is configured to detect domains, not resembling any particular well-known domains that exploit human desires in an attempt to trick people into clicking on them, thereby facilitating phishing attacks.

Figure 13:
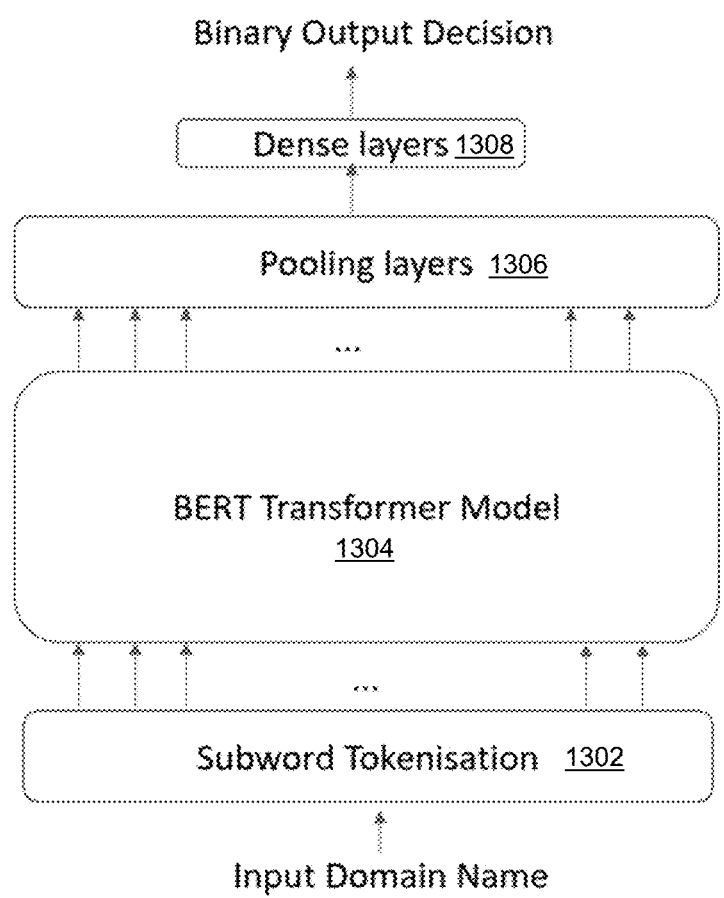
FIG. 13 illustrates the transformer base neural network model used by the general phishing domain detection module to identify possible general phishing domains in accordance with embodiments of the invention.

To achieve this, phishing detection module 135 makes use of Natural Language Processing (NLP) techniques such as transformer architectures to detect such domains. In an embodiment of the invention, instead of training a transformer model from scratch and using character level tokenization, a pre-trained transformer neural network such as, but not limited to, Bidirectional Encoder Representation from Transformers (BERT) model (trained on the open source Wikipedia corpus of text) was used. Transfer learning was then carried out by further fine tuning the model based on a dataset that consisted of domains verified by VirusTotal and PhishTank. The architecture of the model is illustrated in FIG. 13.

The sub-word tokenisation scheme 1302 was then employed with sub-word tokens obtained from the Wikipedia corpus. The sub-word tokenisation scheme 1302 was found to have more semantic meanings and a better ability to understand certain words that are typically used to trick people into clicking on domains such as "win", "free", "watch", etc.

The model was then fine-tuned by taking the pooled output 1306 of the transformer 1304 and then passing it through a few Dense layers 1308 (i.e. multi-level perceptron) to obtain a sigmoid activated binary output that indicates whether a domain is a possible general phishing domain or not.

The training of the model is done using a binary cross entropy loss function. By the end of the training phase, the transformer model is able to take in an input domain name, conduct sub-word tokenisation on it and then output a probability as to whether the input domain is a possible phishing domain or not.

Figure 14:
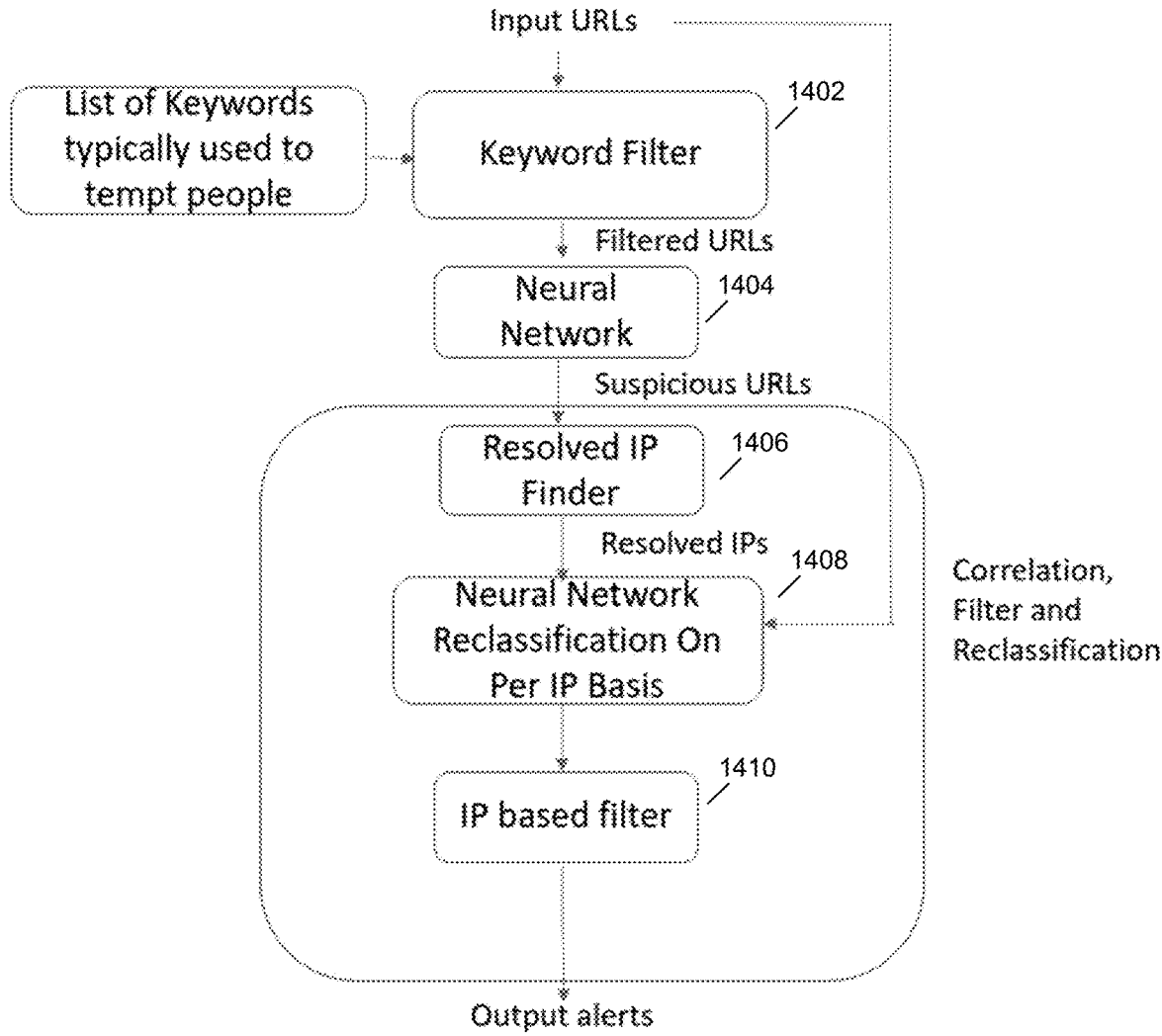
FIG. 14 illustrating a process flow for identifying general phishing domains using a list of keywords, a transformer based neural network and resolved IP addresses.

In order to reduce the number of false alarms when voluminous amounts of large scale network traffic data are provided to phishing detection module 135 an additional workflow was adopted to exploit another feature, the resolved IP addresses. A resolved IP address comprises the DNS server's reply to a querying IP, when the querying IP queries the IP address of a particular domain. This is an important feature as attackers tend to reuse their infrastructure in order to have the widest reach with minimum effort. A study of our data showed that multiple phishing domains tend to reside on the same IP address. The workflow for this process is illustrated in FIG. 14.

A list of keywords that are typically used to tempt people into clicking on sites is initially generated. This list may be obtained via PhishTank and further augmented with additional information to obtain a phishing reference list K. When a set of DNS records are provided, keyword filter will filter away records whose domain names do not have at least one of the keywords in the list K at step 1402.

The remaining domain names, which have at least one of the keywords in the list K, are then provided to the neural network at step 1404 (e.g. the BERT based transformer model). Suspicious domain names (i.e. domain names flagged by neural network 1404 to be possible general phishing domains) obtained from step 1404 are then used, at step 1406, to determine the corresponding resolved IPs for each of these suspicious domains, via the original set of DNS records. This set of suspicious IPs are then labelled as set P.

For each resolved IP in the set of P, all domains that resolved to that particular IP, irrespective of the initial keyword list that was used as a filter are then obtained. For each of these obtained domains, they are then processed through the neural network again to determine whether these obtained domains are suspicious domains that should be flagged and this takes place at step 1408.

If the proportion of domains flagged up as suspicious by the neural network exceeds a particular threshold (50% in our embodiment), domains flagged by the neural network will be produced as alerts, i.e. classified as a general phishing domain, else all alerts will be discarded. This takes place at step 1410.

Alert module 140 comprises blacklist and rule-based filtering module 205 and behavioural analytics module 210 as previously illustrated in FIG. 2.

In this embodiment of the invention, a blacklist of legitimate domains is generated based on past research and based on outcomes obtained from alert module 140 over extended periods of time. Exemplary rules contained within module 205 may instruct alert module 140 to not generate an alert if a domain ends with a specific string such as, but not limited to, ".com.sg" or if a domain ends with trusted address, such as, but not limited to ".gov.sg".

In addition to the use of such a blacklist of legitimate domains, the rules may also be set up to remove possible alerts generated by alert module 140 based on the following rules:
1. The domain name string query associated with each DNS record must be a valid domain name. For example, there must be at least one '.' in the domain name string query.
2. The domain name string must contain a valid Top Level Domain (TLD).
3. There must be valid character in the domain name string.
4. There must be valid number of characters in the domain name string.

Further, this blacklist may be updated periodically based on the outputs produced by alert module 140 over an extended period of time and may also be altered according to the requirements of one skilled in the art.

In a further embodiment of the invention, behavioural analytics module 210 may be configured to process the filtered alerts obtained from blacklist and rule-based filtering module 205 using two types of behavioural analytics: (i) campaign level detection, and (ii) the detection of periodic queries.

When campaign level detection is carried out, IPs (and by extension, organisations) that are experiencing similar types of phishing attacks are initially identified. Such IPs are used as a proxy so that the system is able to detect phishing attack campaigns using just network traffic data.

Given a particular time period of analysis, from the domains that were provided to alert module 140 and subsequently passed through the blacklist and rule-based filtering module 205, a set of querying IPs and their corresponding set of phishing domains that they have queried are obtained. The full set of phishing domains that were flagged up are then consolidated. It should be noted that the size of this set will be the same size as the vector that would be produced for each querying IP.

For each IP that queried at least one of the suspected phishing domains output by module 205, a vector is produced via the following methodology:
1. From the list of suspected phishing domains that the querying IP visited, a count is generated for each of the phishing domains that it visited.
2. Using the counts, the vector is populated.
3. Finally, the vector is L2 normalized. This is to account for organizations of different sizes.
4. Now that each querying IP has a vector associated to it, dimensionality reduction techniques such as Uniform Manifold Approximation and Projection (UMAP) or T-Distributed Stochastic Neighbour Embedding (TSNE) can be applied followed by hierarchical clustering to automatically determine clusters.

Figure 15:
FIG. 15 illustrating an exemplary count based vector for an IP address.

An illustration of the process carried out in step 3 is above is described in detail as follows:
a. In this example, it is assumed that two IPs are querying the suspected phishing domains as shown below:
   aa.bb.cc.dd: [bbb.com, aaa.com, eee.com, aaa.com, bbb.com]
   11.22.33.44: [ccc.com, ccc.com, ddd.com, aaa.com, eee.com]
b. The set of suspected phishing domains are first consolidated as follows:
   [aaa.com, bbb.com, ccc.com, ddd.com, eee.com]
c. As there are five (5) unique suspected phishing domains, the output vector will have a dimension of 5.

d. Next, for each IP, a count-based vector is generated as illustrated in FIG. 15 where count-based vector 1502 is generated for the first IP address "11.22.33.44" while count-based vector 1504 is generated for the second IP address "aa.bb.cc.dd".

e. Finally, these two count-based vectors 1502 and 1504 are L2 normalized so that their magnitudes are both 1.

In other embodiments of the invention, Locality Sensitive Hashing (LSH) may be used in place of hierarchical clustering to obtain vectors that have similar characteristics.

In further embodiments of the invention, behavioural analytics module 210 may be configured to analyse the time stamps of when the queries to the detected phishing domains were made, for each querying IP, to create a time series.

Based on this list of time stamps, the relative times are then computed (i.e. the time difference between each record in the list and the first record in the list). The relative times are then binned into a chosen time interval (i.e. this time interval bins may be referred to as the sampling period). In this embodiment, the sampling period was set at 1 minute (i.e. 60 seconds).

Figure 16:
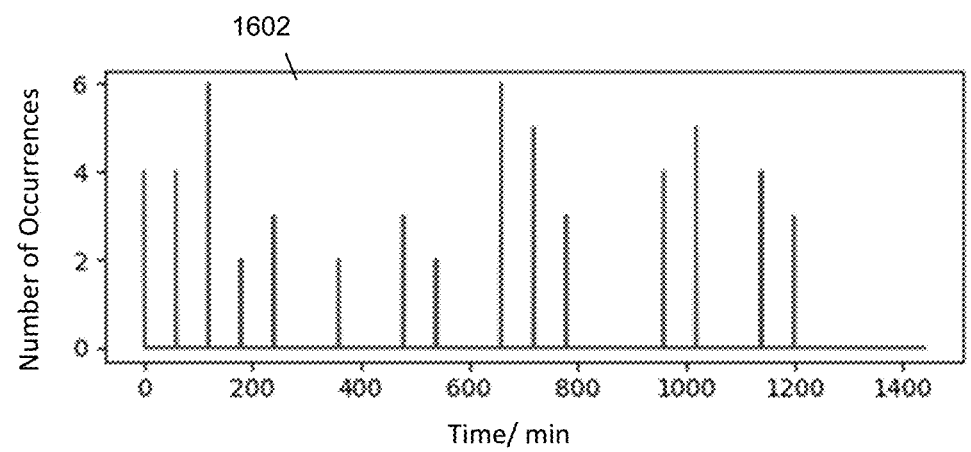
FIG. 16 illustrating an exemplary plot of number of occurrences detected over a fixed period of time.

FIG. 16 illustrates an example of such a plot 1602. As can be seen, the x-axis comprises of 1440 minutes, which is equivalent to one day. This is because in this embodiment, the aim is to determine the frequency of querying such suspected phishing domains within a day. This time period of analysis is arbitrary and can be increased. For each minute (in terms of relative time), the number of queries to identified phishing domains that occurred in that minute, relative to the first record, are consolidated (i.e. binned) and counted. Once plot 1602 has been generated, plot 1602 may be subjected to more advanced frequency analysis.

Figure 17:
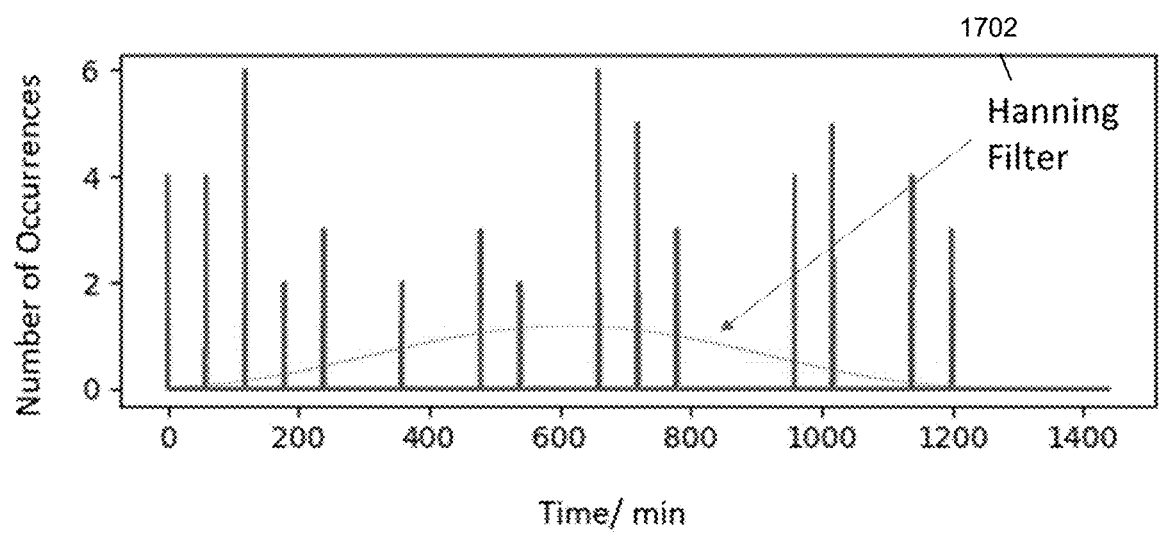
FIG. 17 illustrating the use of a Hamming filter on the plot illustrated in FIG. 16.

In a further embodiment of the invention, after each list of time stamps have been converted to the representation shown in FIG. 17, the above signal is then passed through a Hanning filter 1702 as illustrated in FIG. 17, to reduce "ringing" in the frequency domain. The ringing is a product of the abrupt end of the signal.

In the above example, the signal abruptly ends at ~1200 minutes. This abrupt end is equivalent to a brickwall filter, which is the same as a multiplication with a rect function. As the rect function in the frequency domain is a sinc function, we will see many high side lobes in the frequency domain. Therefore, in this embodiment, the Hanning filter was used, by multiplying the above signal with the Hanning Filter function as shown in FIG. 17. Note that the Hanning filter is applied from 0 to the last time stamp that has a non-zero occurrence. In other embodiments of the invention, other filter functions like Hamming or Blackman filter functions may be used. This signal may then be converted to the frequency domain using typical Discrete Fourier Transform algorithms for additional signal processing and analysis. In our embodiment we made use of frequency determining methods in the frequency domain to determine the presence of periodic signals to determine if the attack has progressed to a later stage.

In an exemplary implementation of the invention, behavioural analytics module 210 was configured to process the filtered alerts obtained from blacklist and rule-based filtering module 205 using two types of behavioural analytics: (i) campaign level detection, and (ii) the detection of periodic queries. The full set of querying IPs that were found to query phishing domains are then generated and plotted as dots in FIG. 18. The clusters shown in FIG. 18, particularly, clusters 1802, 1804, 1806, 1808, 1810, 1812, 1814, 1816, 1818, 1820 indicate various possible phishing campaigns targeting various IP addresses.

Figure 18:
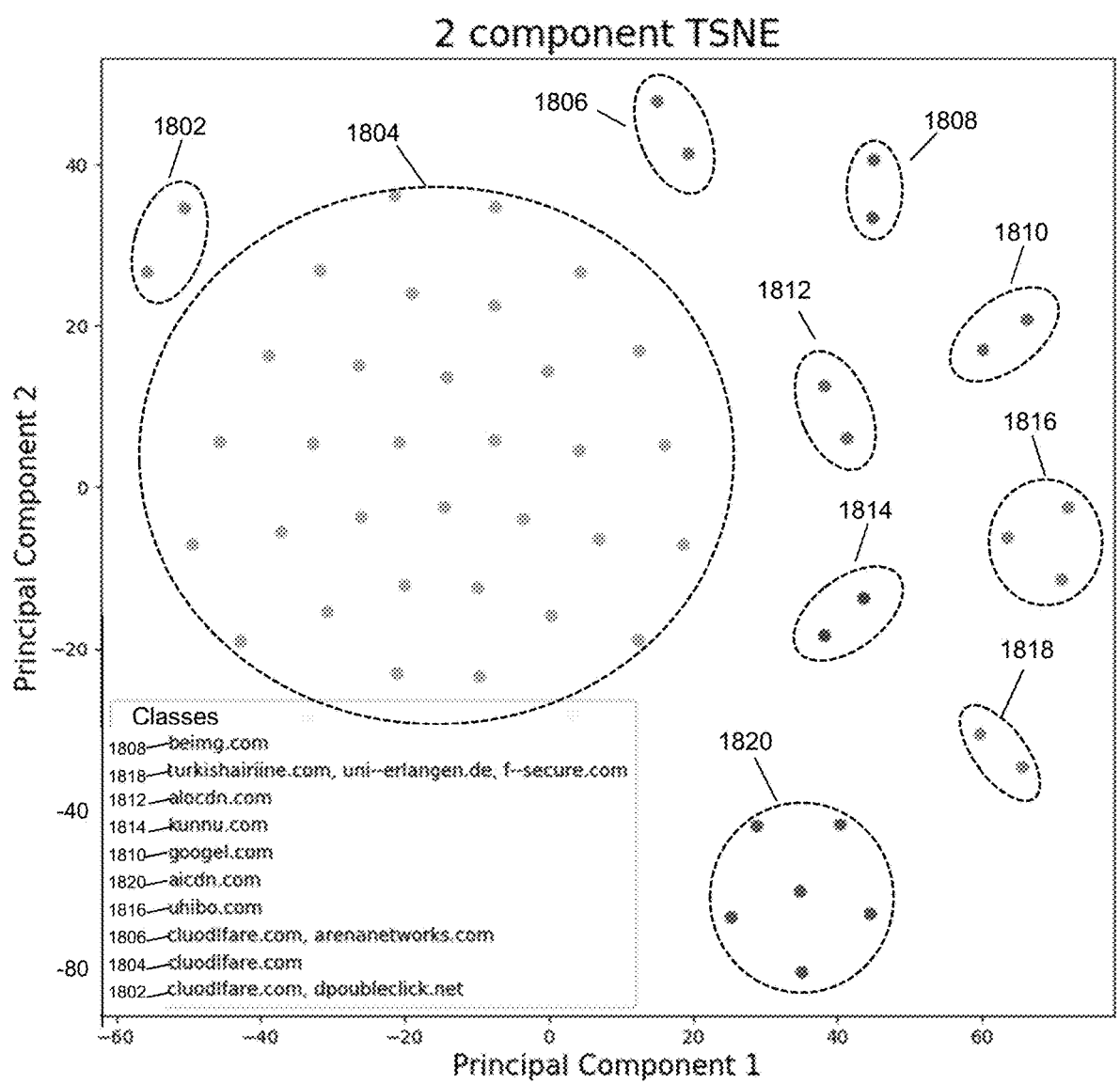
FIG. 18 illustrating exemplary clusters of organizations being targeted by the same malicious domains.
Figure 19:
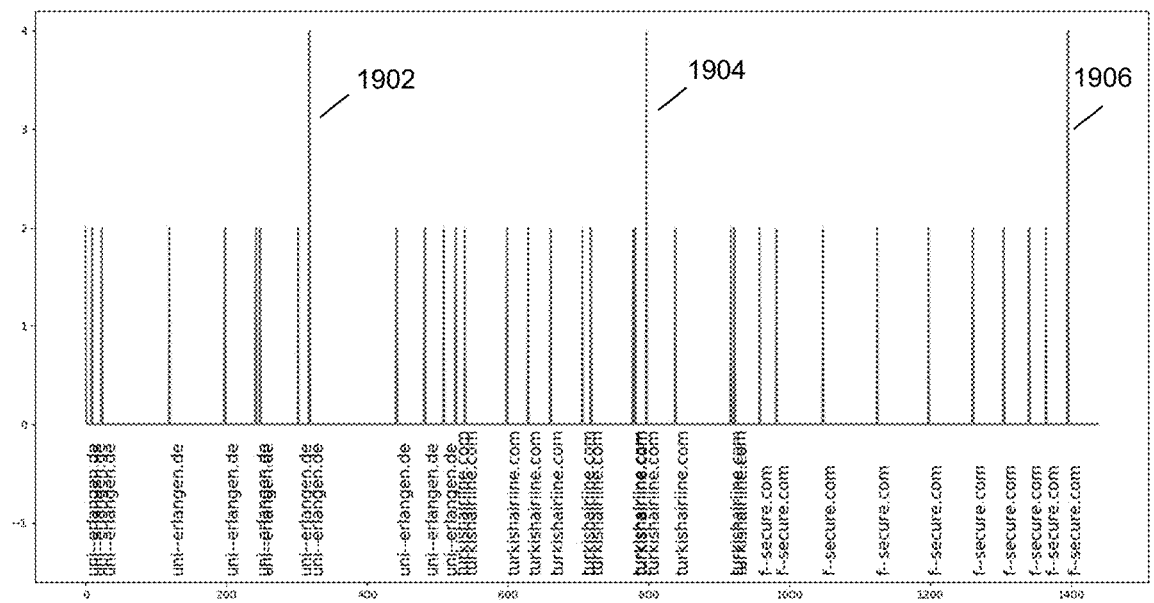
FIG. 19 illustrating an exemplary plot showing the periodicity of the phishing attacks.

When the plot in FIG. 18 was further analysed using frequency analysis, it was found that one cluster of IPs queried similar phishing domains with a clear periodicity of 30 minutes, an example of which is as shown in FIG. 19 whereby peaks 1902, 1904 and 1906 appeared periodically. This periodicity may be used to indicate that such an attack comprises a more advanced attack.

Numerous other changes, substitutions, variations and modifications may be ascertained by one skilled in the art and it is intended that the present invention encompass all such changes, substitutions, variations and modifications as falling within the scope of the appended claims.

The invention claimed is:

1. A system for detecting phishing domains in a set of Domain Name System (DNS) records comprising:
   a memory storing instructions; and
   a processor, coupled to the memory, configured to process the stored instructions cause one or more modules to perform operations, the one or more modules comprising:
      a homoglyph phishing domain detection module comprising a trained homoglyph encoder $E_H$ and a reference database $D_H$, the homoglyph phishing domain detection module being configured to:
         receive string images, $I_{HT\_N}$, that have been rendered from homoglyph domains, wherein the homoglyph domains comprise domains that each comprise puny code;
         encode, using the trained homoglyph encoder $E_H$, each of the string images, $I_{HT\_N}$, into their associated encodings, $e_{HT\_N}$;
         classify each homoglyph domain as a homoglyph phishing domain when an Euclidean distance between the associated encoding, $e_{HT\_N}$, and any encoding in the reference database $D_H$ is below a predetermined threshold;
      a typo-squatting phishing domain detection module comprising a trained typo-squatting encoder $E_S$ and a reference database $D_S$, the typo-squatting phishing domain detection module being configured to:
         receive Swype-like images, $I_{ST\_N}$, of domains that have been rendered from the set of DNS records;
         encode, using the trained typo-squatting encoder $E_S$, each of the Swype-like images, $I_{ST\_N}$, into their associated encodings, $e_{ST\_N}$;
         classify each domain used to generate a set of Swype-like images, $I_{ST\_N}$, as a typo-squatting phishing domain when an Euclidean distance between an associated encoding, $e_{ST\_N}$, and any encoding in the reference database $D_S$ is below a predetermined threshold;
      a general phishing domain detection module comprising a trained transformer based neural network, the general phishing domain detection module being configured to:
         receive domains identified from the set of DNS records to have strings that at least partially match strings in a phishing reference list K;
         generate, using the trained transformer based neural network, a probability score for each of the identified domains;
         resolve Internet Protocol (IP) addresses for each identified domain that has a probability score that exceeds a predetermined probability threshold;
         for each of the resolved IP addresses,
            obtain all external domains associated with the resolved IP address, wherein the external domains refer to all domains within the set of DNS records that resolved to the resolved IP address;
generate, using the transformer based neural network, a probability score for each of the obtained external domains;
classify each obtained external domain that has a probability score that exceeds the predetermined probability threshold as a general phishing domain; and
an alert module configured to produce alerts for phishing domains detected within the set of DNS records based on the homoglyph phishing domains from the homoglyph phishing domain detection module, the typo-squatting phishing domains from the typo-squatting phishing domain detection module and the general phishing domains from the general phishing domain detection module.

2. The system according to claim 1 wherein the alert module comprises a blacklist and rule-based filtering module configured to filter out benign domain names from the identified phishing domains.

3. The system according to claim 2, wherein the alert module further comprises:
a behavioural analytics module configured to:
obtain from the blacklist and rule-based filtering module unfiltered phishing domains;
obtain IP addresses that queried at least one of the unfiltered phishing domains;
for each IP address that queried at least one of the unfiltered phishing domains,
generate a count-based vector based on the number of queries to each unfiltered phishing-domain made by the IP address;
apply a L2 normalization to each count-based vector;
apply Hierarchical clustering to the IP addresses and their associated count-based vectors to identify count-based vectors having similar characteristics; and
classify the IP addresses associated with the identified count-based vectors as IP addresses subjected to identical phishing-attack campaigns.

4. The system according to claim 3 wherein the behavioural analytics module further comprises a dimensionality reduction procedure such as TSNE or UMAP prior to the hierarchical clustering or LSH.

5. The system according to claim 2, wherein the alert module further comprises:
a behavioural analytics module configured to:
obtain from the blacklist and rule-based filtering module unfiltered phishing domains;
obtain IP addresses that queried at least one of the unfiltered phishing domains;
for each IP address that queried at least one of the unfiltered phishing domains,
generate a count-based vector based on a number of queries to each unfiltered phishing-domain made by the IP address;
apply a L2 normalization to each count-based vector;
apply Locality Sensitive Hashing (LSH) to the IP addresses and their associated count-based vectors to identify count-based vectors having similar characteristics; and
classify the IP addresses associated with the identified count-based vectors as IP addresses subjected to phishing-attack campaigns.

6. The system according to claim 2, wherein the alert module further comprises:
a behavioural analytics module further configured to:
obtain from the blacklist and rule-based filtering module unfiltered phishing domains;
obtain IP addresses that queried at least one of the unfiltered phishing domains;
for each IP address that queried at least one of the unfiltered phishing domains,
collect a list of sorted time stamps of when queries to the at least one unfiltered phishing domain was made;
compute relative times using the sorted time stamps, wherein each computed relative time being the time elapsed with respect to a first time stamp;
bin the computed relative times into a desired sampling frequency and count number of entries in each bin to obtain a time series of occurrences, wherein the time series of the occurrences is defined as a number of queries made to the at least one of the unfiltered phishing domains;
apply a Hanning filter to the time series of occurrences; and
conduct frequency analysis on the filtered time series of occurrences to determine presence of periodicity and its associated frequency.

7. The system according to claim 1 wherein the homoglyph encoder $E_H$ is trained by minimizing a triplet loss training function, $L_{triplet}$, with respect to parameters of the homoglyph encoder $E_H$, and the function $L_{triplet}$, is defined as $$L_{triplet} = \min_E \left( \max \left( \|E(A) - E(P)\|^2 - \|E(A) - E(N)\|^2 + M, 0.0 \right) \right)$$

where a Positive input of the function $L_{triplet}$ is provided with a set of images rendered from a set of frequently visited popular Internet domains, an Anchor input of the function $L_{triplet}$ is provided with a set of outputs from a trained Phish-Generative Adversarial Network (Phish-GAN) that each correspond to a glyphed version of a current set's Positive input, a Negative input of the function $L_{triplet}$ is provided with a set of string images of domains sampled from the set of frequently visited popular Internet domains deemed by the encoder $E_H$ to be similar to the current set's Anchor input but excluding an actual positive sample for the current set's Anchor input and
where $E(P)$ is defined as a Positive encoded output, $E(A)$ is defined as an Anchor encoded output, $E(N)$ is defined as a Negative encoded output and M is a margin.

8. The system according to claim 7 wherein the trained Phish-GAN comprises:
a trained generator, G, configured to receive images, x, rendered from a training dataset, y, and randomly generated noise, z, to produce glyphed versions, $G(x,z)$, of each of the received images;
a trained discriminator, D, configured to:
receive the glyphed versions, $G(x,z)$, from the trained generator, G, and images, x; and
classify the images, x, and the glyphed versions, $G(x,z)$, into fake or real images via discriminator function D( ),
whereby the generator, G, is trained using an auxiliary dot product loss function, $L_{dot}$, which is defined as:

$L_{dot} = \text{flat}((G(x,z))) \cdot \text{flat}(x)$ where flat( ) is defined as a flat function that reshapes image tensors to a vector in order to calculate a dot product, and whereby the trained Phish-GAN comprises generator objective function, G*, and discriminator objective function, D*, which are defined as $$G^* = \min_G(\log(D(x)) + \log(1 - D(G(x,z))) + L_{dot})$$

$$D^* = \max_D(\log(D(x)) + \log(1 - D(G(x,z))))$$

9. The system according to claim 1 wherein the homoglyph encoder $E_H$ is trained by minimizing a Normalized Temperature-scaled Cross Entropy (NT-Xent) loss function, $L_{NT-Xent}$, defined as $$L_{NT-Xent} = \min - \left(\log\left[\frac{e^{\frac{s_{a,p}}{\tau}}}{\sum_{n=1}^{b_n} e^{\frac{s_{a,n}}{\tau}}}\right]\right)$$

where a Positive input of the function $L_{NT-Xent}$ is provided with a set of images rendered from a set of frequently visited popular Internet domains, an Anchor input of the function $L_{NT-Xent}$ is provided with a set of outputs from a trained Phish-Generative Adversarial Network (Phish-GAN) that each correspond to a glyphed version of a current set's Positive input, a Negative input of the function $L_{NT-Xent}$ is provided with a set of a batch of string images of domains from the set of frequently visited popular Internet domains deemed by the encoder $E_H$ to be similar to the current set's Anchor input but excluding an actual positive sample for the current set's Anchor input, and where $s_{a,p}$ is a cosine similarity measure between encodings of an anchor and a positive samples and $s_{a,n}$ is a cosine similarity measure between encodings of an anchor and a negative sample.

10. The system according to claim 1 wherein the typo-squatting encoder $E_S$ is trained by minimizing a Normalized Temperature-scaled Cross Entropy (NT-Xent) loss function, $L_{NT-Xent}$, defined as $$L_{NT-Xent} = \min - \left(\log\left[\frac{e^{\frac{s_{a,p}}{\tau}}}{\sum_{n=1}^{b_n} e^{\frac{s_{a,n}}{\tau}}}\right]\right)$$

where a Positive input of the function $L_{NT-Xent}$ is provided with a set of Swype-like images rendered from a set of frequently visited popular Internet domains, an Anchor input of the function $L_{NT-Xent}$ is provided with a set of Swype-like images of generated typo-squatting phishing domains targeting an associated set's Positive input, a Negative input of the function $L_{NT-Xent}$ is provided with a set of a batch of Swype-like images of domains from the set of frequently visited popular Internet domains deemed by the encoder $E_S$ to be similar to a current set's Anchor input but excluding an actual positive sample for the current set's Anchor input, and where $s_{a,p}$ is a cosine similarity measure between encodings of an anchor and a positive sample and $s_{a,n}$ is a cosine similarity measure between encodings of an anchor and a negative sample.

11. The system according to claim 1 wherein the typo-squatting encoder $E_S$ is trained by minimizing a Triplet loss function, $L_{triplet}$, defined as $$L_{triplet} = \min_E(\max(\|E(A) - E(P)\|^2 - \|E(A) - E(N)\|^2 + M, 0.0)$$

where a Positive input of the function $L_{triplet}$ is provided with a set of Swype-like images rendered from a set of frequently visited popular Internet domains, an Anchor input of the function $L_{triplet}$ is provided with a set of Swype-like images of generated typo-squatting phishing domains targeting an associated set's Positive input, a Negative input of the function $L_{triplet}$ is provided with a set of a batch of Swype-like images of domains from the set of frequently visited popular Internet domains deemed by the encoder $E_S$ to be similar to a current set's Anchor input but excluding an actual positive sample for the current set's Anchor input, and where E(P) is defined as a Positive encoded output, E(A) is defined as an Anchor encoded output, E(N) is defined as a Negative encoded output and M is the margin.

12. The system according to claim 1 wherein the transformer based neural network is trained using a binary cross entropy loss function.

13. The system according to claim 1 wherein the generation of the probability score for each of the identified domains using the general phishing domain detection module comprises the general phishing domain detection module being configured to:
 conduct sub-word tokenisation on each of the identified domains, and
 generate, using the trained transformer based neural network, the probability score based on the sub-word tokens.

14. The system according to claim 13 wherein the general phishing domain detection module is further configured to:
 for each of the resolved IP addresses,
  obtain the externals domains, where the external domains comprise domains that resolve to the resolved IP addresses,
  generate, using the trained transformer based neural network, the probability score for each external domain based on the sub-word tokens; and
  classify the external domains whose probability score exceeds the predetermined threshold as general phishing domains when it is determined that a percentage of the obtained external domains classified as general phishing domains exceeds a percentage threshold.

15. The system according to claim 1 wherein,
 the classifying of each homoglyph domain as a homoglyph phishing domain by the homoglyph phishing domain detection module comprises the homoglyph phishing domain detection module is configured to:
  classify each homoglyph domain as a homoglyph phishing domain when a cosine similarity between an associated encoding, $e_{HT\_N}$, and any encoding in the reference database $D_H$ is above a predetermined threshold;
 the classifying of each domain used to generate the set of Swype-like images, $I_{ST\_N}$, by the typo-squatting phishing domain detection module comprises the typo-squatting phishing domain detection module is configured to:
  classify each domain used to generate the set of Swype-like images, $I_{ST\_N}$, as a typo-squatting phishing domain when a cosine similarity measure between an associated encoding, $e_{ST\_N}$, and any encoding in the reference database $D_S$ is above a predetermined threshold.

16. The system according to claim 1 wherein, the homoglyph phishing domain detection module is further configured to:
    receive string images, $I_{HT\_Nall}$, that have been rendered from all queried domains;
    encode, using the trained homoglyph encoder $E_H$, each of the string images, $I_{HT\_Nall}$ into their associated encodings, $e_{HT\_Nall}$;
    classify each queried domain as a lookalike phishing domain when a similarity metric between an associated encoding, $e_{HT\_N}$, and any encoding in the reference database $D_H$ crosses a predetermined threshold.

17. A method for detecting phishing domains in a set of Domain Name System (DNS) records using a homoglyph phishing domain detection module comprising a trained homoglyph encoder $E_H$ and a reference database $D_H$, a typo-squatting phishing domain detection module comprising a trained typo-squatting encoder $E_S$ and a reference database $D_S$, a general phishing domain detection module comprising a trained transformer based neural network and an alert module, the method comprising:
    receiving, using the homoglyph phishing domain detection module, string images, $I_{HT\_N}$, that have been rendered from homoglyph domains,
        wherein the homoglyph domains comprise domains that each comprise puny code;
    encode, using the trained homoglyph encoder $E_H$, each of the string images, $I_{HT\_N}$, into their associated encodings, $e_{HT\_N}$;
    classifying, using the homoglyph phishing domain detection module, each homoglyph domain as a homoglyph phishing domain when an Euclidean distance between an associated encoding, $e_{HT\_N}$, and any encoding in the reference database $D_H$ is below a predetermined threshold;
    receiving, using the typo-squatting phishing domain detection module, Swype-like images, $I_{ST\_N}$, of domains that have been rendered from the set of DNS records;
    encoding, using the trained typo-squatting encoder $E_S$ of the typo-squatting phishing domain detection module, each of the Swype-like images, $I_{ST\_N}$, into their associated encodings, $e_{ST\_N}$;
    classifying, using the typo-squatting phishing domain detection module, each domain used to generate a set of Swype-like images, $I_{ST\_N}$, as a typo-squatting phishing domain when an Euclidean distance between an associated encoding, $e_{ST\_N}$, and any encoding in the reference database $D_S$ is below a predetermined threshold;
    receiving, using the general phishing domain detection module, domains identified from the set of DNS records to have strings that at least partially match strings in a phishing reference list K;
    generating, using the trained transformer based neural network of the general phishing domain detection module, a probability score for each of the identified domains;
    resolving, using the general phishing domain detection module, Internet Protocol (IP) addresses for each identified domain that has a probability score that exceeds a predetermined probability threshold;
    for each of the resolved IP addresses, using the general phishing domain detection module to:
        obtain all external domains associated with the resolved IP address, wherein the external domains refer to all domains within the set of DNS records that resolved to the resolved IP address;
        generate, using the transformer based neural network, a probability score for each of the obtained external domains;
        classify each obtained external domain that has a probability score that exceeds the predetermined probability threshold as a general phishing domain; and
    producing, using the alert module, alerts for the phishing domains detected within the set of DNS records based on the homoglyph phishing domains from the homoglyph phishing domain detection module, the typo-squatting phishing domains from the typo-squatting phishing domain detection module and the general phishing domains from the general phishing domain detection module.

18. The method according to claim 17 wherein the producing the alerts using the alert module comprises:
    filtering out, using a blacklist and rule-based filtering module, benign domain names from identified phishing domains.

19. The method according to claim 18, wherein the producing alerts using the alert module comprises:
    obtaining, using a behavioural analytics module, from the blacklist and rule-based filtering module unfiltered phishing domains;
    obtaining, using the behavioural analytics module, IP addresses that queried at least one of the unfiltered phishing domains;
    for each IP address that queried at least one of the unfiltered phishing domains, using the behavioural analytics module to:
        generate a count-based vector based on a number of queries to each unfiltered phishing-domain made by the IP address;
        apply a L2 normalization to each count-based vector;
    applying, using the behavioural analytics module, Hierarchical clustering to the IP addresses and their associated count-based vectors to identify count-based vectors having similar characteristics; and
    classifying, using the behavioural analytics module, the IP addresses associated with the identified count-based vectors as IP addresses subjected to identical phishing-attack campaigns.

20. The method according to claim 18, wherein the producing alerts using the alert module comprises:
    obtaining, using the behavioural analytics module, from the blacklist and rule-based filtering module unfiltered phishing domains;
    obtaining, using the behavioural analytics module, IP addresses that queried at least one of the unfiltered phishing domains;
    for each IP address that queried at least one of the unfiltered phishing domains, using the behavioural analytics module to:
        generate a count-based vector based on a number of queries to each unfiltered phishing domain made by the IP address;
        apply a L2 normalization to each count-based vector;
    applying, using the behavioural analytics module, Locality Sensitive Hashing (LSH) to the IP addresses and their associated count-based vectors to identify count-based vectors having similar characteristics; and classifying, using the behavioural analytics module, IP addresses associated with the identified count-based vectors as IP addresses subjected to phishing-attack campaigns.

\* \* \* \* \*

UNITED STATES PATENT AND TRADEMARK OFFICE
CERTIFICATE OF CORRECTION

PATENT NO. : 12,113,828 B2  
APPLICATION NO. : 17/662583  
DATED : October 8, 2024  
INVENTOR(S) : Lee et al.

Page 1 of 1

It is certified that error appears in the above-identified patent and that said Letters Patent is hereby corrected as shown below:

In the Claims

In Column 28, Claim 6, Line 19, delete "of the occurrences" and insert -- of occurrences --.

In Column 28, Claim 7, Line 29, delete "$L_{tripet}$," and insert -- $L_{triplet}$, --.

In Column 28, Claim 7, Line 37, delete "$L_{tripet}$" and insert -- $L_{triplet}$ --.

In Column 28, Claim 7, Line 40, delete "$L_{tripet}$" and insert -- $L_{triplet}$ --.

In Column 28, Claim 7, Line 44, delete "$L_{tripet}$" and insert -- $L_{triplet}$ --.

In Column 30, Claim 11, Line 8, delete "$L_{tripet}$" and insert -- $L_{triplet}$ --.

In Column 30, Claim 11, Line 11, delete "$L_{tripet}$" and insert -- $L_{triplet}$ --.

In Column 32, Claim 18, Lines 21-22, delete "the producing the alerts" and insert -- producing the alerts --.

In Column 32, Claim 19, Lines 26-27, delete "the producing alerts" and insert -- producing the alerts --.

In Column 32, Claim 20, Line 49-50, delete "the producing alerts" and insert -- producing the alerts --.

Signed and Sealed this  
Fourth Day of February, 2025

Coke Morgan Stewart  
*Acting Director of the United States Patent and Trademark Office*